(12) United States Patent
Matsumoto et al.

(10) Patent No.: US 10,232,963 B2
(45) Date of Patent: Mar. 19, 2019

(54) PACKAGING DEVICE

(71) Applicant: Brother Kogyo Kabushiki Kaisha, Nagoya-shi, Aichi-ken (JP)

(72) Inventors: Haruki Matsumoto, Nagoya (JP); Toshihiro Takahashi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 460 days.

(21) Appl. No.: 15/054,417

(22) Filed: Feb. 26, 2016

(65) Prior Publication Data

US 2016/0176551 A1 Jun. 23, 2016

Related U.S. Application Data

(63) Continuation-in-part of application No. PCT/JP2014/066546, filed on Jun. 23, 2014.

(30) Foreign Application Priority Data

Aug. 26, 2013 (JP) .................................. 2013-174069

(51) Int. Cl.
*B65B 11/10* (2006.01)
*B65B 7/28* (2006.01)
(Continued)

(52) U.S. Cl.
CPC ............ *B65B 7/2878* (2013.01); *B29C 65/02* (2013.01); *B29C 65/4815* (2013.01);
(Continued)

(58) Field of Classification Search
CPC .................. B29C 66/849; B29C 43/18; B29C 43/185–43/188; B29C 65/02;
(Continued)

(56) References Cited

U.S. PATENT DOCUMENTS 4,663,915 A * 5/1987 Van Erden .............. B65B 9/073
493/214
4,738,078 A 4/1988 Benz et al.
(Continued)

FOREIGN PATENT DOCUMENTS

EP 0120251 A1 10/1984
JP S57-133829 A 8/1982
(Continued)

OTHER PUBLICATIONS

Mar. 1, 2016—(WO) IPRP—App PCT/JP2014/066546.
(Continued)

*Primary Examiner* — Andrew M Tecco
*Assistant Examiner* — Praachi M Pathak
(74) *Attorney, Agent, or Firm* — Banner & Witcoff, Ltd.

(57) ABSTRACT

A packaging device includes a resin film, a covering device, and a heating device. The film includes a welding portion containing a hot melt adhesive and is capable of being welded to a portion to be welded. The covering device covers, with the film, at least a part of a packaging object placed on a base formed of corrugated cardboard and at least a part of the base. The heating device heats a contact portion with the base in a state in which the welding portion of the film is in contact with the base. When heat is added by pressing the welding portion against the base, the hot melt adhesive in the welding portion melts and bonds the corrugated cardboard and the film. Polar functional groups introduced into the surface layer of the film are mixed and combined with the functional groups contained in a fiber of the base.

14 Claims, 17 Drawing Sheets

(51) Int. Cl.
*B29C 65/02* (2006.01)
*C09J 201/00* (2006.01)
*B29C 65/48* (2006.01)
*B29C 65/78* (2006.01)
*B29C 65/00* (2006.01)
*B65B 41/12* (2006.01)

(52) U.S. Cl.
CPC ........ *B29C 65/7891* (2013.01); *B29C 66/028* (2013.01); *B29C 66/4322* (2013.01); *B29C 66/723* (2013.01); *B29C 66/7392* (2013.01); *B29C 66/7486* (2013.01); *B29C 66/849* (2013.01); *B65B 11/10* (2013.01); *C09J 201/00* (2013.01); *B29C 66/1122* (2013.01); *B29C 66/71* (2013.01); *B65B 41/12* (2013.01)

(58) Field of Classification Search
CPC . B29C 65/48; B29C 65/4815; B29C 65/4835; B65B 11/06; B65B 11/08; B65B 11/10; B65B 51/14; B65B 51/22
USPC ........ 428/411.1, 515; 156/308.2, 308.4, 383; 425/384–385; 53/209, 228, 229
See application file for complete search history.

(56) References Cited

U.S. PATENT DOCUMENTS

| | | | | |
|---|---|---|---|---|
| 6,302,027 | B1* | 10/2001 | Compton | B32B 27/08 102/323 |
| 6,534,144 | B1* | 3/2003 | Bando | B29C 63/04 156/291 |
| 2012/0114269 | A1 | 5/2012 | Futase et al. | |
| 2012/0291399 | A1* | 11/2012 | Bonneville | B65B 9/04 53/203 |
| 2013/0298503 | A1* | 11/2013 | Takahashi | B65B 41/16 53/389.4 |

FOREIGN PATENT DOCUMENTS

| | | |
|---|---|---|
| JP | S59-187510 A | 10/1984 |
| JP | H01-111604 A | 4/1989 |
| JP | H03-059954 U | 6/1991 |
| JP | H04-059551 A | 2/1992 |
| JP | H05-068808 U | 9/1993 |
| JP | H11-001203 A | 1/1999 |
| JP | H11-124119 A | 5/1999 |
| JP | H11-171117 A | 6/1999 |
| JP | 2001-010605 A | 1/2001 |
| JP | 2002-068131 A | 3/2002 |
| JP | 2003-096391 A | 4/2003 |
| JP | 2006-116728 A | 5/2006 |
| JP | 2009-057068 A | 3/2009 |
| JP | 2011-006102 A | 1/2011 |
| JP | 2011-189954 A | 9/2011 |
| JP | 2012-034624 A | 2/2012 |
| JP | 2013-039691 A | 2/2013 |

OTHER PUBLICATIONS

Aug. 22, 2017—(JP) Notification of Reasons for Rejection—App 2015-534050, Eng Tran.
Sep. 22, 2014—International Search Report—Intl App PCT/JP2014/066546.

* cited by examiner

PACKAGING DEVICE

CROSS-REFERENCE TO RELATED APPLICATION

This application is a continuation-in-part of International Application No. PCT/JP2014/066546, filed Jun. 23, 2014, which claims priority from Japanese Patent Application No. 2013-174069, filed on Aug. 26, 2013. This disclosure of the foregoing application is hereby incorporated by reference in its entirety.

BACKGROUND

The present disclosure relates to a packaging device on which it is possible to mount a resin film that can be welded to a portion to be welded.

A packaging device is known that overlaps the edges of a resin film used to package a packaging object, and heats and seals the overlapped edges. In this manner, the packaging device can package the packaging object. With the packaging device, it is difficult to package the packaging object depending on the shape and size of the packaging object. Further, when the packaging object moves in the resin film in a state in which a gap is generated between the sealed resin film and the packaging object, there is a case in which protection of the packaging object becomes insufficient. Therefore, the known packaging device fixes the packaging object placed on a base, such as corrugated cardboard, by wrapping both the packaging object and the base with the resin film, and thereby protects the packaging object. Generally, the packaging device uses resin films made of polyethylene, polypropylene and the like for packaging. It is known that it is difficult to weld these resin films to corrugated cardboard etc. For that reason, a packaging device is known that uses a base to which an adhesive that is melded by heat is applied in advance. This packaging device heats the adhesive over the resin film in an adhesive application position, and melts the adhesive. In this manner, this packaging device can bond the resin film to the base.

SUMMARY

However, with the known packaging device, it is necessary to provide an adhesive on the base in advance, which is troublesome.

Various embodiments of the general principles described herein provide a packaging device on which it is possible to mount a film that can be directly welded to a portion to be welded, a welding film and a film cassette.

Embodiments herein provide a packaging device including a resin film, a covering device, and a heating device. The resin film includes a welding portion capable of being welded to a portion to be welded. The welding portion contains a hot melt adhesive. The covering device is configured to cover, with the resin film, at least a part of a packaging object placed on a base and at least a part of the base. The base is made of paper. The heating device is configured to heat a contact portion with the base in a state in which the contact portion is in contact with the base. The contact portion is a part of the welding portion of the resin film.

Embodiments herein also provide a packaging device including a film, a covering device, and a heating device. The film in which a number of polar functional groups contained in a surface layer is larger than a number of polar functional groups contained in another section. The film includes a welding portion capable of being welded to a portion to be welded. The covering device is configured to cover, with the film, at least a part of a packaging object placed on a base and at least a part of the base. The base is made of paper. The heating device is configured to heat a contact portion with the base in a state in which the contact portion is in contact with the base. The contact portion is a part of the welding portion of the film.

Embodiments herein further provide a packaging device including a mounting portion, a covering device, and a heating device. The mounting portion allows attachment and detachment of a shaft member of a film roll formed by winding a resin film around the shaft member. The resin film includes a welding portion which contains a hot melt adhesive and which is capable of being welded to a portion to be welded. The covering device is configured to cover at least a part of a packaging object placed on a base and at least a part of the base, using the resin film pulled out from the film roll. The base is made of paper. The heating device is configured to heat a contact portion with the base in a state in which the contact portion is in contact with the base. The contact portion is a part of the welding portion of the resin film.

BRIEF DESCRIPTION OF THE DRAWINGS

Embodiments will be described below in detail with reference to the accompanying drawings in which.

DETAILED DESCRIPTION

Figure 1:
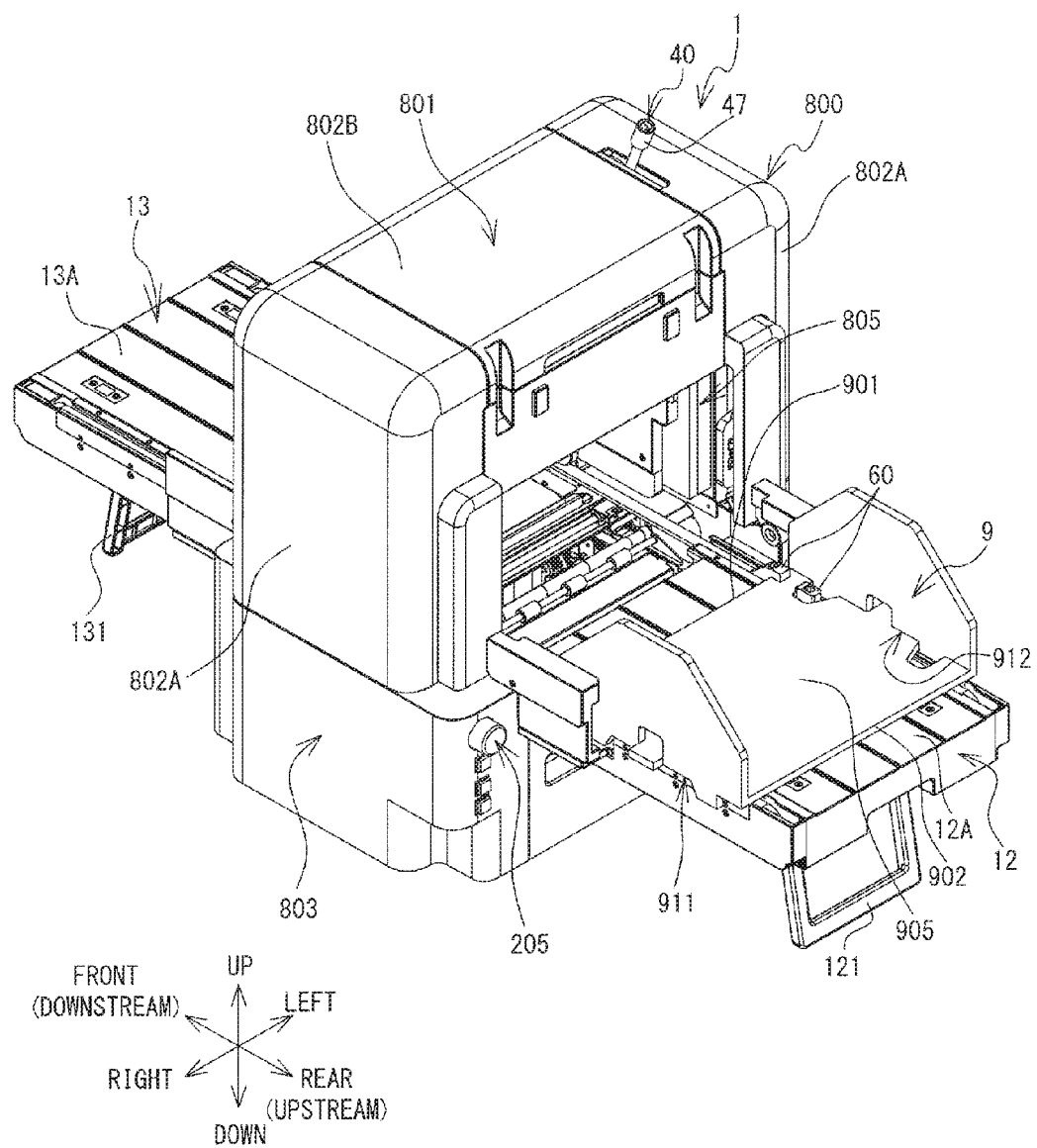
FIG. 1 is a perspective view of a packaging device 1 when a housing 800 has been mounted, as viewed from the rear right side.
Figure 2:
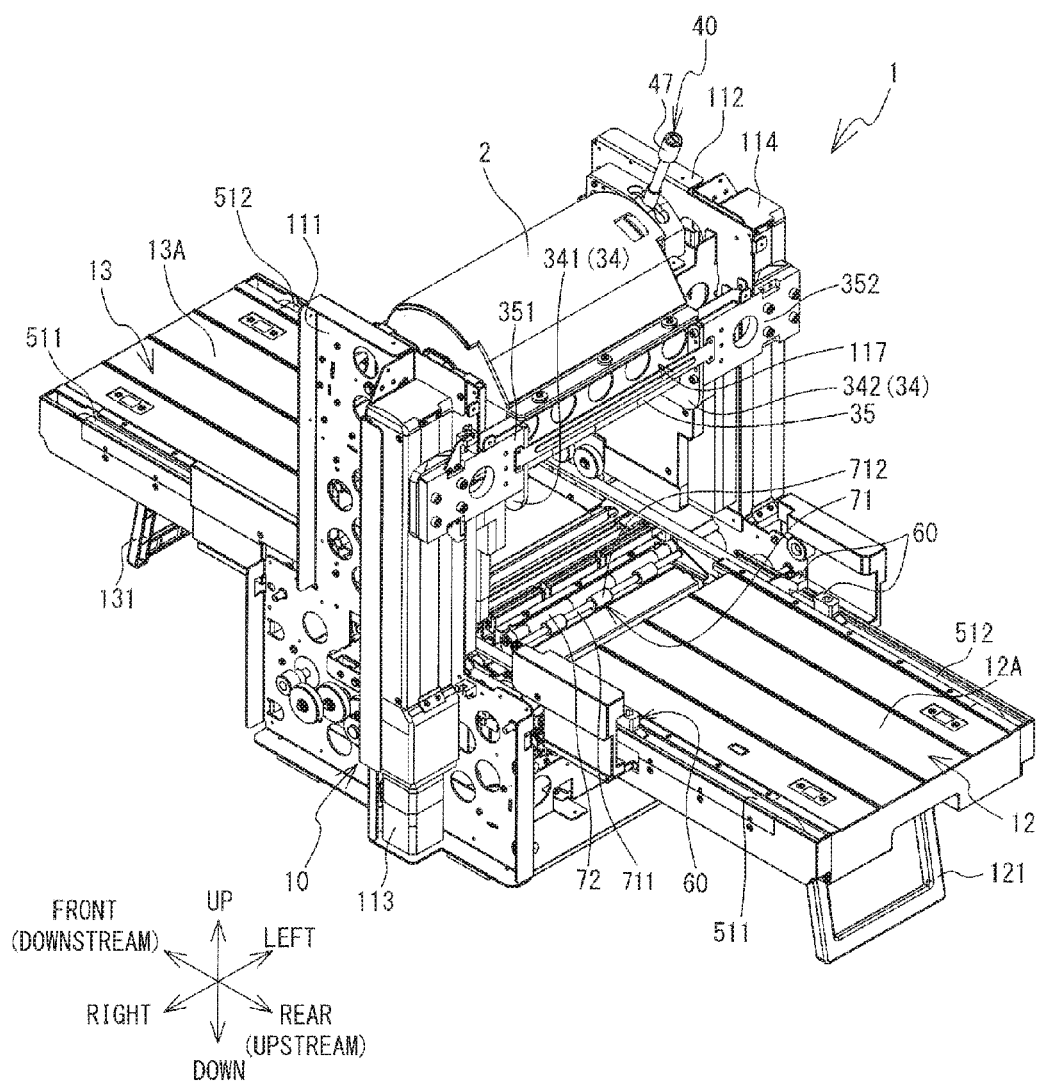
FIG. 2 is perspective view of the packaging device 1 when the housing 800 has been removed, as viewed from the rear right side.

Hereinafter, an embodiment of the present disclosure will be explained with reference to the drawings. In FIG. 1, the upper left side, the lower right side, the upper right side, the lower left side, the upper side and the lower side respectively correspond to the front side, the rear side, the left side, the right side, the upper side and the lower side of a packaging device 1. When the packaging device 1 is used, a receiving tray 13 is disposed in front of a receiving tray 12 and receiving surfaces 12A and 13A of the receiving trays 12 and 13 are respectively directed upward. A base 9 is conveyed in the front-rear direction (hereinafter also referred to as a "conveyance direction") on the receiving trays 12 and 13. In some cases, the front side of the packaging device 1 is referred to as a downstream side in the conveyance direction and the rear side of the packaging device 1 is referred to as an upstream side in the conveyance direction. In FIG. 2 onwards, the orientations of respective portions that form the packaging device 1 correspond to the orientation of the packaging device 1 in FIG. 1.

An outline of the packaging device 1 will be explained. The packaging device 1 is a device that, using a film 24, packages the base 9 and an article (hereinafter also referred to as a "packaging object 3," refer to FIG. 3) that is placed on the base 9 (refer to FIG. 14). While conveying the base 9 from the rear toward the front, the packaging device 1 packages the base 9 and the packaging object 3 (refer to FIG. 11 to FIG. 14).

As shown in FIG. 1, the packaging device 1 is provided with a housing 800. The housing 800 has a substantially cuboid shape that is long in the up-down direction. The housing 800 is provided with an upper housing 801 and a lower housing 803. The lower housing 803 has a substantially cuboid shape that is long in the left-right direction. The lower housing 803 is provided with an input portion 205 on the right end side of the rear surface. The input portion 205 receives an operation input by an operator. The upper housing 801 is provided with a bridge portion 802B and two standing portions 802A. The two standing portions 802A respectively extend upward from the left end and the right end of the lower housing 803. The bridge portion 802B is provided between the respective upper ends of the two standing portions 802A. The two standing portions 802A respectively cover side plate portions 111 and 112 (refer to FIG. 2) from the outside in the left-right direction. The bridge portion 802B covers a film cassette 2 (refer to FIG. 2) from above. The packaging device 1 has an opening 805 that is surrounded by the lower housing 803, the two standing portions 802A and the bridge portion 802B. The opening 805 is communicated with the front side surface and the rear side surface of the housing 800.

The packaging device 1 is provided with the receiving tray 12 and the receiving tray 13. The receiving tray 12 extends substantially horizontally toward the upstream side from the upper edge of the front side surface of the lower housing 803. The receiving tray 13 extends substantially horizontally toward the downstream side from the upper edge of the rear side surface of the lower housing 803. Each of the receiving trays 12 and 13 has a box shape that is substantially rectangular in a plan view and that is long in the conveyance direction. Leg portions 121 and 131 are provided on the lower side of the receiving trays 12 and 13, respectively. The leg portions 121 and 131 respectively support the receiving trays 12 and 13 from below, and maintain the top surfaces of the receiving trays 12 and 13 horizontally. Hereinafter, the top surface of the receiving tray 12 is referred to as the "receiving surface 12A," and the top surface of the receiving tray 13 is referred to as the "receiving surface 13A." Each of the receiving surfaces 12A and 13A is horizontal. The receiving surfaces 12A and 13A form a single plane. The packaging object 3 and the base 9 before packaging are conveyed on the receiving surface 12A toward the opening 805. The packaging object 3 and the base 9 that have been packaged are conveyed on the receiving surface 13A. Hereinafter, a path section along which the base 9 is conveyed on the plane that is formed by the receiving surfaces 12A and 13A is referred to as a "conveyance path 103" (refer to FIG. 3). Although not shown in the drawings, the receiving trays 12 and 13 can swing such that each of the receiving surfaces 12A and 13A is vertical.

As shown in FIG. 2, the packaging device 1 is provided with a bottom portion 10 and the side plate portions 111 and 112. The bottom portion 10 has a rectangular shape in a plan view. The side plate portion 111 extends vertically upward from the right edge of the bottom portion 10. The side plate portion 112 extends vertically upward from the left edge of the bottom portion 10. The side plate portions 111 and 112 are shaped as substantially rectangular plates whose long sides extend in the up-down direction.

Belts 511 and 512 are respectively provided on the right edges and the left edges of the receiving trays 12 and 13. The belts 511 and 512 are endless belts and inner surfaces of each of the belts 511 and 512 are provided with teeth. The belts 511 and 512 are made of a composite material of fiber and urethane rubber or the like, and they are elastically deformable. The belts 511 and 512 extend from the upstream end of the receiving tray 12 to the downstream end of the receiving tray 13.

Figure 3:
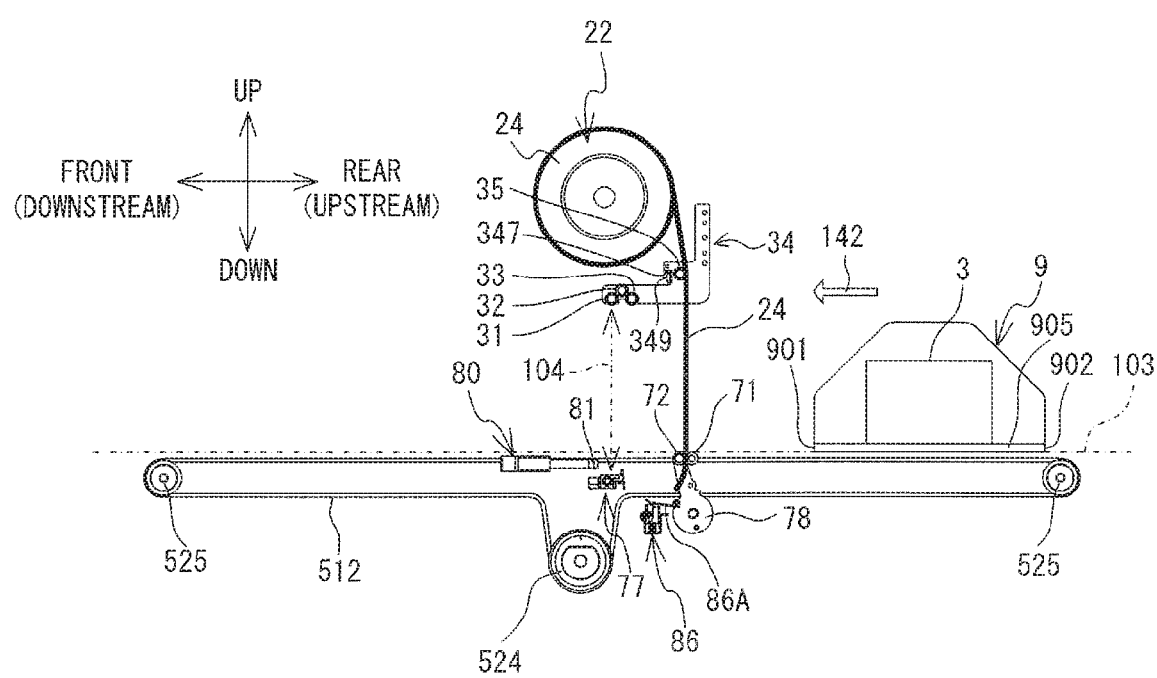
FIG. 3 is a diagram showing a packaging process by packaging processing.

As shown in FIG. 3, the belt 512 is routed around one driving pulley 524 and two driven pulleys 525. The driving pulley 524 is disposed at substantially the center, in the conveyance direction, of the left side surface of the side plate portion 112 (refer to FIG. 2). The driven pulleys 525 are provided, respectively, at the upstream end in the conveyance direction of the receiving tray 12 and the downstream end in the conveyance direction of the receiving tray 13. The central axes of the driving pulley 524 and the driven pulleys 525 extend in the left-right direction. The driving pulley 524 and the driven pulleys 525 are in contact with the inside of the belt 512. Teeth are provided on the outer surfaces of the driving pulley 524 and the driven pulleys 525, and mesh with the teeth on the inner surface of the belt 512. The driving pulley 524 is coupled to a driving motor 222 (refer to FIG. 9) via a plurality of gears. The motor 222 is provided below an upstream section of the receiving tray 13. The belt 512 rotates in accordance with rotational driving of the driving pulley 524. The driven pulleys 525 are used to determine the position of the belt 512. Although not shown in the drawings, in the same manner as the belt 512, the belt 511 is also routed around one driving pulley (not shown in the drawings) and two driven pulleys (not shown in the drawings).

As shown in FIG. 2, conveyance portions 60 are provided on the outer side surfaces of the belts 511 and 512, respectively. As the belts 511 and 512 rotate, the conveyance portions 60 move from above the receiving tray 12 to above the receiving tray 13. The conveyance portions 60 engage with the base 9 and convey the base 9 from the upstream side toward the downstream side.

Figure 4:
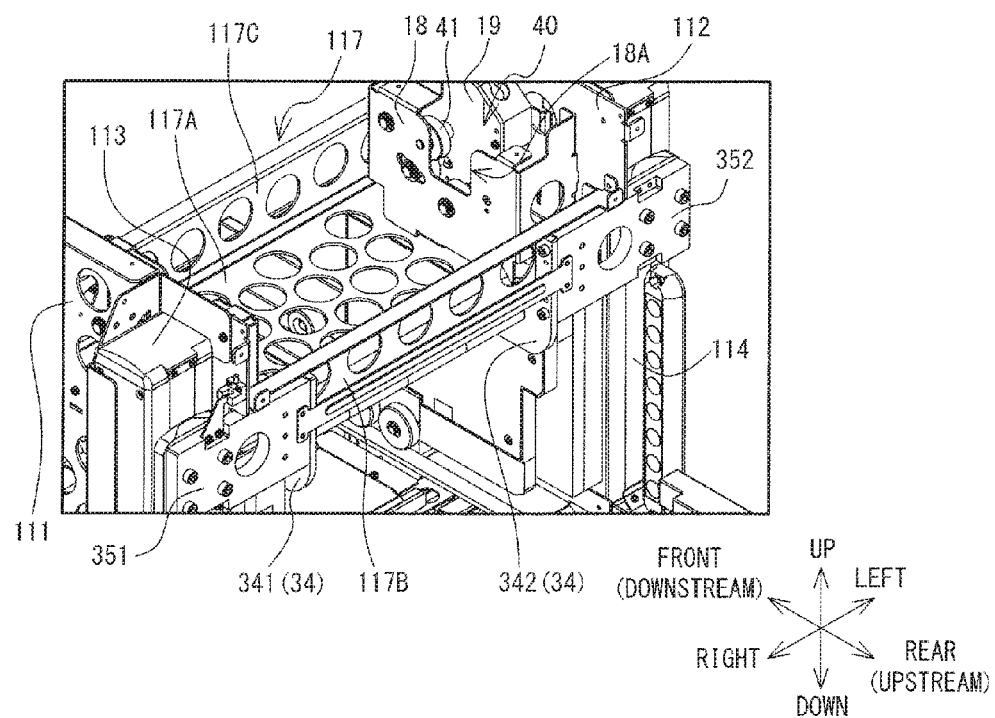
FIG. 4 is a perspective view of the vicinity of the upper ends of side plate portions 111 and 112.

As shown in FIG. 2 and FIG. 4, a plate-shaped bridge plate 117 is mounted between the upper edge of the side plate portion 111 and the upper edge of the side plate portion 112. The bridge plate 117 is provided with a horizontal portion 117A and vertical potions 117B and 117C. The horizontal portion 117A extends horizontally to the left from the upper edge of the side plate portion 111 and is connected to the upper edge of the side plate portion 112. The vertical portion 117B extends vertically upward from the upstream edge of the horizontal portion 117A. The vertical portion 117C extends vertically upward from the downstream edge of the horizontal portion 117A. A film cassette 2 (to be described later) is configured such that it can be placed on the upper side of the horizontal portion 117A. The bridge plate 117 has a torque adjustment mechanism 40, which will be described later, on the upper side of the horizontal portion 117A and on the right side surface of the side plate portion 112. The torque adjustment mechanism 40 is supported by the left side of a support plate 19 that extends in parallel with the side plate portion 112. A recessed portion 18A is provided in a section of a wall plate 18 that covers the upstream side, the downstream side and the right side of the torque adjustment mechanism 40. The recessed portion 18A is recessed downward from the upper edge of the section that covers the right side of the torque adjustment mechanism 40. A protruding portion 253 (refer to FIG. 7) of the film cassette 2 is mounted in the recessed portion 18A. The torque adjustment mechanism 40 is a mechanism for adjusting the magnitude of tension exerted on the film 24 (refer to FIG. 3) that is fed out from a film roll 22. The torque adjustment mechanism 40 is provided with a plurality of gears (not shown in the drawings) including a gear 41 that meshes with a gear 273 (refer to FIG. 7) of the film cassette 2. The torque adjustment mechanism 40 switches the meshing of the gears in accordance with an operation position of a lever 47, and adjusts the torque applied to the gear 273. A detailed description of the structure of the torque adjustment mechanism 40 is omitted.

A protruding portion 113 that protrudes to the right is provided on the right side surface of the side plate portion 111. A protruding portion 114 that protrudes to the left is provided on the left side surface of the side plate portion 112. Each of the protruding portions 113 and 114 has a box shape that extends in the up-down direction. A carriage (not shown in the drawings) is provided in each of the protruding portions 113 and 114. The carriages are driven by rotation of a motor 221 (refer to FIG. 9). The carriage in the protruding portion 113 is connected to a support plate portion 351 at an upstream section of the protruding portion 113. The support plate portion 351 has a plate shape. A support portion 341 is connected to the left side of the support plate portion 351. The carriage in the protruding portion 114 is connected to a support plate portion 352 at an upstream section of the protruding portion 114. The support plate portion 352 has a plate shape. A support portion 342 is connected to the right side of the support plate portion 352. Hereinafter, the support portions 341 and 342 are sometimes collectively referred to as a support portion 34 or support portions 34. The motor 221 can cause the support portions 34, which are respectively connected to the support plate portions 351 and 352 via the carriages, to move in the up-down direction.

Figure 5:
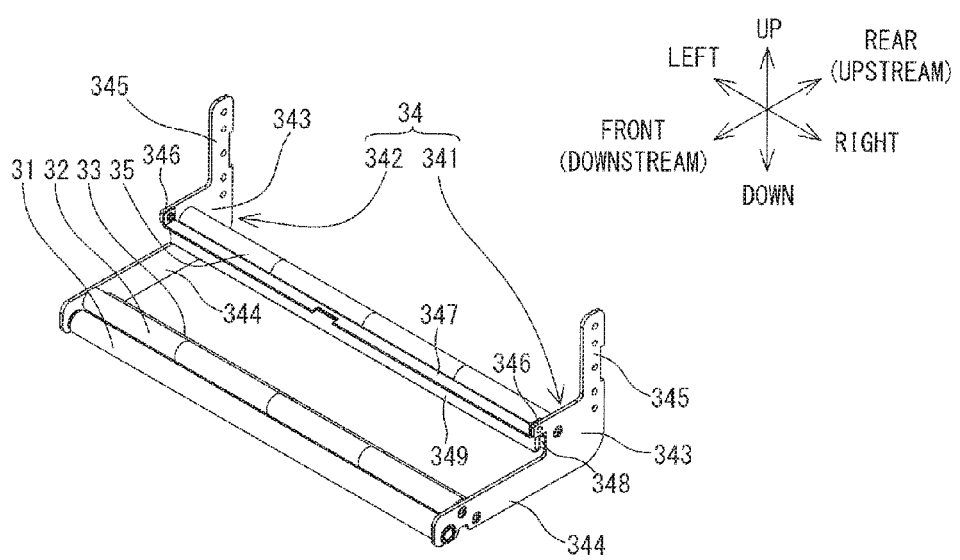
FIG. 5 is a perspective view of a support portion 34.

As shown in FIG. 5, the support portions 341 and 342 are plate-shaped members each having a substantially reverse L shape in a right side view. Each of the support portions 341 and 342 is provided with a base portion 343, a forward extending portion 344, an upward extending portion 345 and a projecting portion 346. The base portion 343 has a substantially rectangular shape and the lower corner on the upstream side of the base portion 343 is trimmed. The forward extending portion 344 extends forward from a lower portion on the downstream side of the base portion 343. The upward extending portion 345 extends upward from an upper portion on the upstream side of the base portion 343. The projecting portion 346 projects forward from an upper portion on the downstream side of the base portion 343. A gap is provided between the forward extending portion 344 and the projecting portion 346. The support portions 341 and 342 respectively support left and right end portions of a guide roller 31, a first auxiliary roller 32, a second auxiliary roller 33 and a third auxiliary roller 35. The guide roller 31, the first auxiliary roller 32, the second auxiliary roller 33 and the third auxiliary roller 35 are arranged in that order from the front toward the rear. The guide roller 31, the first auxiliary roller 32 and the second auxiliary roller 33 are supported by downstream end portions of the forward extending portions 344. Lower end positions, in the up-down direction, of the guide roller 31 and the second auxiliary roller 33 are substantially the same. The first auxiliary roller 32 is positioned higher than the guide roller 31 and the second auxiliary roller 33. The third auxiliary roller 35 is supported by the upper portions on the downstream side of the base portions 343. The third auxiliary roller 35 is positioned higher than the first auxiliary roller 32.

A plate-shaped locking member 347 that extends in the left-right direction is provided between the projecting portions 346 of the support portions 341 and 342. The locking member 347 is disposed to be thick in the up-down direction, and forms a bridge between the lower ends of the projecting portions 346. In a packaging process to be described later, the locking member 347 restricts upward movement of an edge portion 902 (refer to FIG. 14) on the upstream side of the base 9. An edge portion 348 on the upstream side of the locking member 347 protrudes downward (refer to FIG. 15), and forms a bridge between the forward extending portion 344 and the projecting portion 346 at the downstream end of the base portion 343. A plate-shaped second pressing member 349 that extends in the left-right direction is provided on the front surface of the edge portion 348. The second pressing member 349 is an elastic member, and in the packaging process to be described later, it restricts the edge portion 902 (refer to FIG. 13) on the upstream side of the base 9 from moving toward the upstream side.

Figure 12:
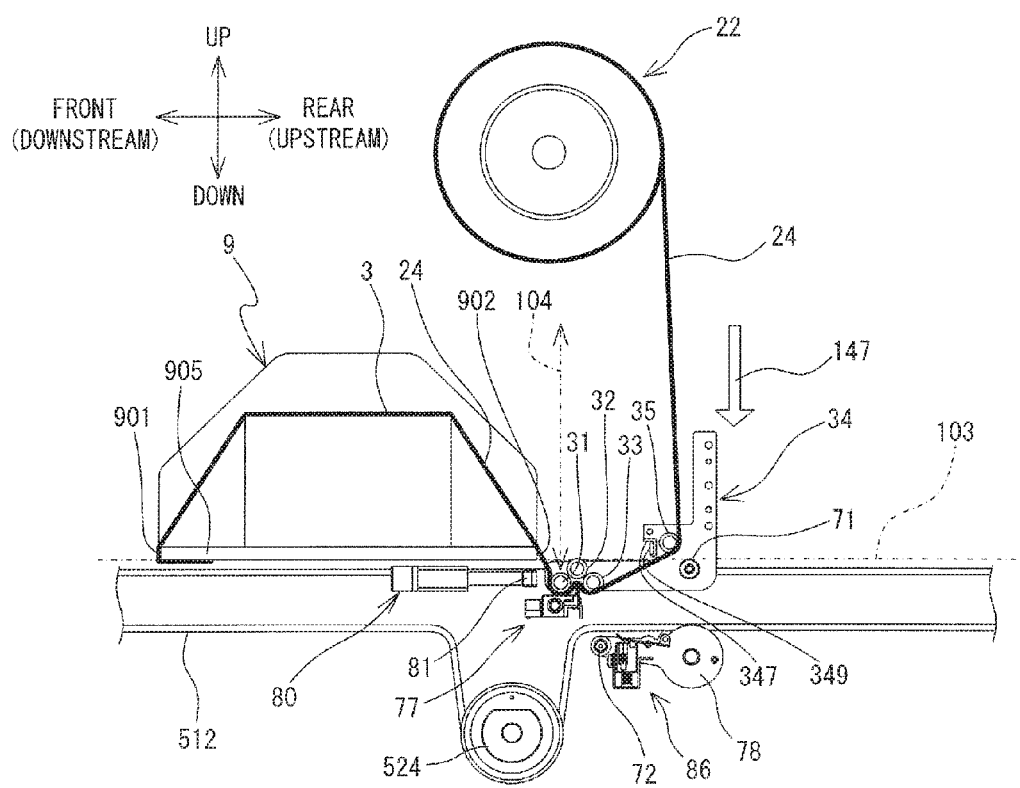
FIG. 12 is a diagram showing a packaging process by the packaging processing.

The support portion 34 moves up and down between a highest position (refer to FIG. 3) and a lowest position (refer to FIG. 12). Hereinafter, the path along which the guide roller 31 is moved up and down by the movement of the support portion 34 is referred to as a "movement path 104" (refer to FIG. 3). As shown in FIG. 3, when the guide roller 31 has moved to its lowest position along the movement path 104 (refer to FIG. 12), the guide roller 31 is positioned below the conveyance path 103. The conveyance path 103 and the movement path 104 intersect each other. The packaging device 1 is provided with a cutting portion 77 below the conveyance path 103 between the side plate portions 111 and 112 (refer to FIG. 2). The cutting portion 77 is provided with a cutting blade (not shown in the drawings) whose cutting edge protrudes diagonally upward. The cutting blade moves left and right while being guided by a guide rail (not shown in the drawings) that extends in the left-right direction. As shown in FIG. 12, when the support portion 34 has moved to the lowest position, the cutting blade is disposed between the guide roller 31 and the second auxiliary roller 33. The cutting blade moves by driving of a motor 225 (refer to FIG. 9), and cuts the film 24 in the width direction.

As shown in FIG. 2 and FIG. 3, the packaging device 1 is provided with a guide roller 71. The guide roller 71 is provided on the upstream side of a section between the side plate portions 111 and 112, and below the conveyance path 103 (refer to FIG. 3). As shown in FIG. 2, the guide roller 71 is provided with a shaft portion 711 and a plurality of roller portions 712. The shaft portion 711 extends in the left-right direction. The plurality of roller portions 712 are provided at equal intervals in the axial direction of the shaft portion 711. The guide roller 71 supports the base 9 that is conveyed from the upstream side toward the downstream side along the conveyance path 103, from below and between the receiving trays 12 and 13, and guides the base 9 from the receiving tray 12 to the receiving tray 13. As shown in FIG. 12, when the support portion 34 is disposed at the lowest position, the third auxiliary roller 35 is disposed above and in the vicinity of the guide roller 71.

As shown in FIG. 2 and FIG. 3, the packaging device 1 is provided with a holding roller 72 on the downstream side of the guide roller 71. The holding roller 72 extends in the left-right direction. As shown in FIG. 3, a holding portion 78 rotatably supports the left and right ends of the holding roller 72. The packaging device 1 supports the holding portion 78 such that the holding portion 78 can swing. The swinging of the holding portion 78 switches the holding roller 72 between a state in which the holding roller 72 is positioned close to the downstream side of the guide roller 71 (refer to FIG. 3) and a state in which the holding roller 72 has been moved downward, away from the guide roller 71 (refer to FIG. 12). When the holding roller 72 is positioned close to the downstream side of the guide roller 71, the holding roller 72 can hold the film 24 discharged from the film cassette 2 such that the film 24 is clamped between the holding roller 72 and the guide roller 71.

Figure 6:
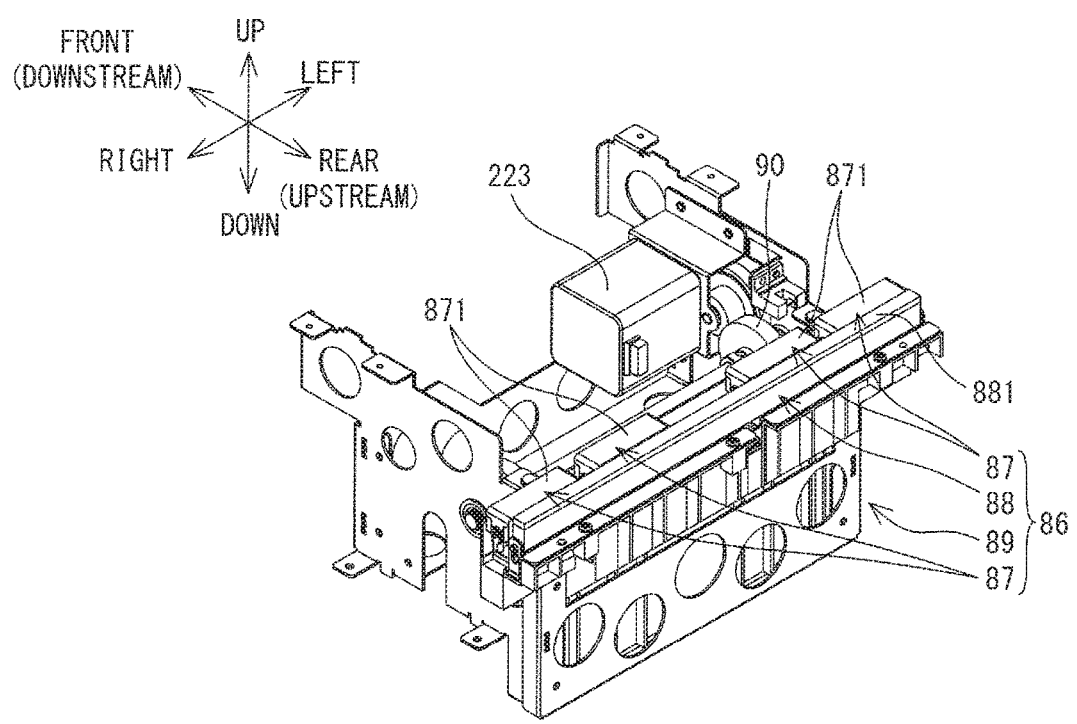
FIG. 6 is a perspective view of a heating portion 86.

The packaging device 1 is provided with a heating portion 86 close to the downstream side of the holding roller 72. As shown in FIG. 6, the heating portion 86 is provided with four heating units 87, a first pressing member 88 and a base portion 89. The four heating units 87 are arranged side by side in the left-right direction. Heaters 871 (refer to FIG. 9) are provided on the top surfaces of the four heating units 87, respectively. The heaters 871 are resistance heating type heaters that generate heat when an electric current flows. The heaters 871 can come into contact with the film 24 and heat the film 24. The first pressing member 88 extends in the left-right direction, and is disposed on the upstream side of the four heating units 87. The top surface of the first pressing member 88 is provided with a plate-shaped elastic member 881 that extends in the left-right direction. The four heating units 87 and the first pressing member 88 are held on an upper portion of the base portion 89. The four heating units 87 and the first pressing member 88 are respectively urged upward from the base portion 89 by spring members 872 and 882 (refer to FIG. 15) that are provided on the upper portion of the base portion 89. More specifically, the heating units 87 and the first pressing member 88 can move independently from each other. When the heating units 87 and the first pressing member 88 are not receiving an external force, the upper end of the first pressing member 88 is positioned higher than the upper end of the heating units 87. A rack gear 891 (refer to FIG. 15) that extends in the up-down direction is provided on the downstream side of the base portion 89. The rack gear 891 meshes with a pinion gear 90 having a rotational axis that extends in the left-right direction. A motor 223 is provided on the downstream side of the base portion 89. The pinion gear 90 is connected to a rotational axis of the motor 223 via a plurality of gears (not shown in the drawings). The motor 223 is disposed above the bottom portion 10 (refer to FIG. 2), in the section between the side plate portions 111 and 112 (refer to FIG. 2). The heating portion 86 moves in the up-down direction by driving of the motor 223. Normally, the heating portion 86 stands by at a lower position (a standby position, refer to FIG. 3), and at the time of welding, it moves to an upper position (a heating position, refer to FIG. 11). When the heating portion 86 is disposed in the standby position, the top surfaces of the heaters 871 are covered by a lid portion 86A.

As shown in FIG. 3, the packaging device 1 is provided with a rotation inhibiting portion 80 on the downstream side of the heating portion 86. The upstream end of the rotation inhibiting portion 80 is provided with a stopper 81. The stopper 81 has a rod shape whose cross-sectional shape is square, and extends in the left-right direction. An elastic member (not shown in the drawings), such as a rubber member, is provided on the upstream side surface of the stopper 81. The rotation inhibiting portion 80 drives the stopper 81 in the front-rear direction. When the rotation inhibiting portion 80 moves the stopper 81 to the rear side (the upstream side in the conveyance direction), the stopper 81 is pressed to the guide roller 31 side (refer to FIG. 13). The stopper 81 stops rotation of the guide roller 31 by a frictional force.

The base 9 will be explained. As shown in FIG. 1, the base 9 is formed by folding a substantially rectangular plate-shaped member, upwardly at left and right folding portions 912 and 911. For example, corrugated cardboard is used to form the base 9. In the explanation below, a section below forms the bottom wall of the base 9 is referred to as a plate-shaped portion 905. Further, in a state in which the base 9 is arranged on the packaging device 1, the downstream edge of the plate-shaped portion 905 is referred to as an edge portion 901, and the upstream edge of the plate-shaped portion 905 is referred to as the edge portion 902.

Figure 7:
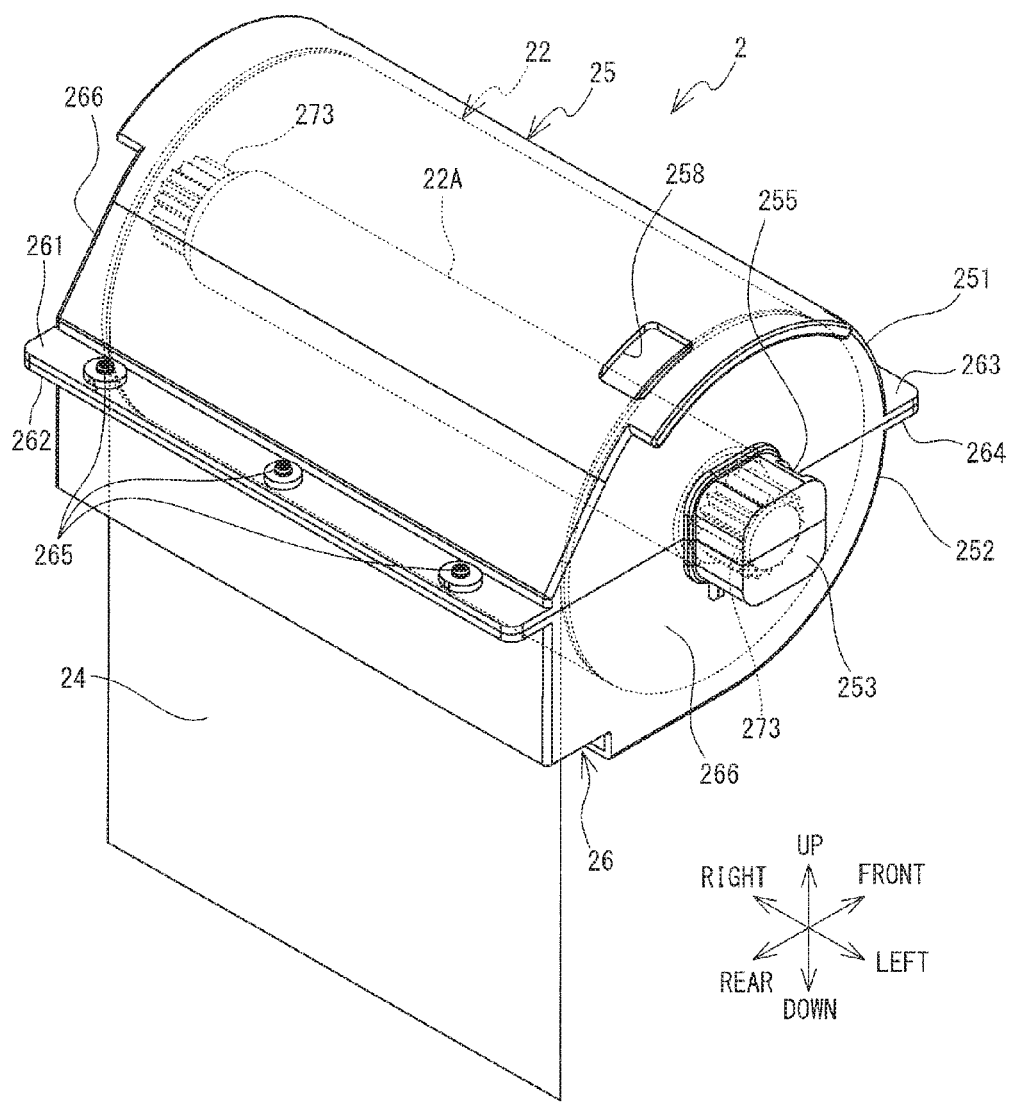
FIG. 7 is a perspective view of a film cassette 2.

The film cassette 2 will be explained with reference to FIG. 7. In the explanation below, the upper right side, the lower left side, the lower right side, the upper left side, the upper side and the lower side of FIG. 7 respectively correspond to the front side, the rear side, the left side, the right side, the upper side and the lower side of the film cassette 2. Note that, when the film cassette 2 is placed on the horizontal portion 117A of the bridge plate 117 of the packaging device 1, it is placed such that the rear side of the film cassette 2 is directed to the front side (the upstream side) of the packaging device 1.

The film cassette 2 is provided with a cassette case 25 and the film roll 22. The cassette case 25 has a substantially columnar outer shape, and is a housing whose rear end portion has a flat surface that faces the rear. The cassette case 25 contains therein the film roll 22. The film roll 22 has a substantially cylindrical shape, and extends in the left-right direction. The cassette case 25 rotatably supports the left end and the right end of the film roll 22, at the left end and the right end of the cassette case 25. In other words, a rotating shaft of the film roll 22 extends in the left-right direction. In the explanation below, in some cases, the left-right direction of the film cassette 2 is referred to as an axial direction. The film roll 22 includes a cylindrical shaped core 22A and the packaging film 24 that is wound around the periphery of the core 22A. Note that the film 24 is wound around the film roll 22 in a direction in which a welding layer 248 (refer to FIG. 8) is arranged on the outer peripheral surface of the film 24.

The cassette case 25 is provided with an upper case 251 and a lower case 252. The upper case 251 is provided with flange portions 263 and 261 that protrude forward and rearward in a flange shape from the front lower end and the rear lower end of the upper case 251, respectively. In a similar manner, the lower case 252 is provided with flange portions 264 and 262 that protrude forward and rearward in a flange shape from the front upper end and the rear upper end of the lower case 252, respectively. The upper case 251 and the lower case 252 form the cassette case 25 by fixing the flange portions 263 and 261 to the flange portions 264 and 262 using screws 265. When the film cassette 2 is placed on the bridge plate 117 (refer to FIG. 2) of the packaging device 1, the flange portions 264 and 262 of the lower case 252 are supported by the upper edges of the vertical portions 117C and 117B.

A protruding portion 253 that protrudes leftward is provided at a central portion of a left side wall 266 of the cassette case 25. Although not shown in the drawings, a protruding portion 253 that protrudes rightward is provided at a central portion of a right side wall 266 of the cassette case 25. A hole 255 is formed in the front surface of each of the left and right protruding portions 253. A pair of gears 273 are provided on the left and right ends of the core 22A of the film roll 22. The pair of gears 273 are respectively housed in the left and right protruding portions 253 of the cassette case 25. The cassette case 25 supports the core 22A, and rotatably supports the film roll 22 inside the cassette case 25. The pair of gears 273 are exposed to the outside from the holes 255 of the left and right protruding portions 253. When the film cassette 2 is placed on the bridge plate 117 (refer to FIG. 2) of the packaging device 1, the protruding portion 253 is fitted into the recessed portion 18A (refer to FIG. 4) of the torque adjustment mechanism 40, and thus the core 22A is mounted in the recessed portion 18A. The gear 273 on the left end of the core 22A meshes with the gear 41 (refer to FIG. 4) of the torque adjustment mechanism 40.

The lower end of a rear end portion of the cassette case 25 is provided with a discharge opening 26. The discharge opening 26 is a hole that extends from a left end portion to a right end portion of the cassette case 25, in parallel with the axial direction. The film 24 that has been pulled out from the film roll 22 is discharged from the discharge opening 26 to the outside of the cassette case 25. An upper right portion of the cassette case 25 is provided with an opening 258. Via the opening 258, the operator can confirm a remaining amount of the film 24 wound around the film roll 22 housed in the cassette case 25.

Next, the film 24 that is wound around the core 22A of the film roll 22 will be explained. The film 24 is a film made of a hydrocarbon-based resin, such as polyethylene, polypropylene or the like, for example. The film 24 of the present embodiment is a two-layer film formed by laminating a base layer 249 and the welding layer 248. The base layer 249 is a hydrocarbon-based resin film. As the material of the base layer 249, in addition to an olefin-based resin, such as polyethylene, polypropylene or the like, it is possible to use polyvinyl chloride, polyurethane, polyethylene terephthalate, polycarbonate, polystyrene, an ABS resin, polyamide (nylon resin), a fluorine resin (Teflon (registered trademark)), an EVA resin, a phenolic resin, a melamine resin, an epoxy resin, and the like.

The welding layer 248 is a film made by mixing a hot-melt adhesive with a hydrocarbon-based resin at a predetermined mixing ratio. In a similar manner to the base layer 249, as the hydrocarbon-based resin, in addition to an olefin-based resin, such as polyethylene, polypropylene or the like, it is possible to use polyvinyl chloride, polyurethane, polyethylene terephthalate, polycarbonate, polystyrene, an ABS resin, polyamide (nylon resin), a fluorine resin (Teflon (registered trademark)), an EVA resin, a phenolic resin, a melamine resin, an epoxy resin, and the like.

The hot melt adhesive is a thermoplastic adhesive made by mixing a base polymer, a wax, a tackifying resin, an antioxidant and a coloring agent at a predetermined mixing ratio. As the base polymer, it is possible to use, for example, an ethylene-vinyl acetate (EVA) copolymer, an ethylene-ethyl acrylate (EEA) copolymer, an ethylene-methyl acrylate (EMA) copolymer, an ethylene-methacrylic acid (EMAA) copolymer, an ethylene-acrylic acid (EAA) copolymer, ethylene normal butyl acrylate (EnBA), natural rubber, a styrene-butadiene-styrene (SBS) copolymer, a styrene-isoprene-styrene (SIS) copolymer, a styrene-ethylene-butylene-styrene (SEBS) copolymer, a styrene-butadiene-butylene-styrene (SBBS) copolymer, and the like. As the base polymer, one type of the above-described materials may be used singularly or two or more types of the above-described materials may be used in combination.

As the wax, it is possible to use, for example, a paraffin wax, a micro wax, a polyethylene wax, a polypropylene wax, and the like. As the wax, one type of the above-described materials may be used singularly or two or more types of the above-described materials may be used in combination. As the tackifying resin, it is possible to use, for example, a rosin-based resin (such as rosin or rosin esters: a natural rosin, a modified rosin, a hydrogenated rosin), a terpene-based resin, a petroleum-based resin, a coumarone-based resin, a styrene-based resin, a phenol-based resin, and the like. As the tackifying resin, one type of the above-described materials may be used singularly or two or more types of the above-described materials may be used in combination. As the antioxidant, it is possible to use, for example, a phenol-based antioxidant, a hindered phenol-based antioxidant, a thioether-based antioxidant, a phosphite-based antioxidant, antioxidants based on tocopherols, antioxidants based on bis-benzotriazole, antioxidants based on thiophenyl bis-benzoxazole derivatives, antioxidants based on benzophenone, and the like. As the antioxidant, one type of the above-described materials may be used singularly or two or more types of the above-described materials may be used in combination. As the coloring agent, it is possible to use, for example, titanium oxide.

For example, in a film made of polyethylene [$(CH_2CH_2)$n], the polymer bonds of carbon and hydrogen are arranged not only in a deep layer portion of the film but also in a surface layer portion, and the film is non-polar. It is difficult to fix this type of polyethylene film to the base formed of corrugated cardboard or the like. Thus, in the present embodiment, as described above, the welding layer 248 obtained by mixing a hydrocarbon-based resin and a hot melt adhesive is provided in the film 24.

Meanwhile, a film is known that is obtained by introducing polar functional groups into the surface layer of a resin film. For example, a packaging film is known in which, in order to perform printing on the resin film, the film surface is modified by applying a corona treatment onto the surface of the resin film and ink fixability is improved. Since the corona treatment is applied, the surface of the resin film becomes rough. Further, wettability is increased by oxidation, and the fixability of inks and adhesives is improved.

In the resin film to which the corona treatment has been applied, polar functional groups are introduced into its surface layer. Since corrugated cardboard or the like includes functional groups of cellulose in pulpwood fiber, when the inventor directly welded the resin film subjected to the corona treatment to the corrugated cardboard base, it was able to fix the resin film. The welding layer 248 of the film 24 contains a hydrocarbon-based resin. Therefore, if polar functional groups are introduced into a surface layer portion 24S (refer to FIG. 8) of the welding layer 248, it is possible to enhance the welding strength with respect to the base 9 formed of corrugated cardboard or the like.

In the present embodiment, in order to introduce polar functional groups into the surface layer portion 24S of the welding layer 248, the corona treatment is applied to the welding layer 248. Hereinafter, the principle of introducing polar functional groups into the surface layer portion 24S of the welding layer 248 by the corona treatment and enabling enhancement of the welding strength of the film 24 with respect to the base 9 will be explained briefly.

Figure 8:
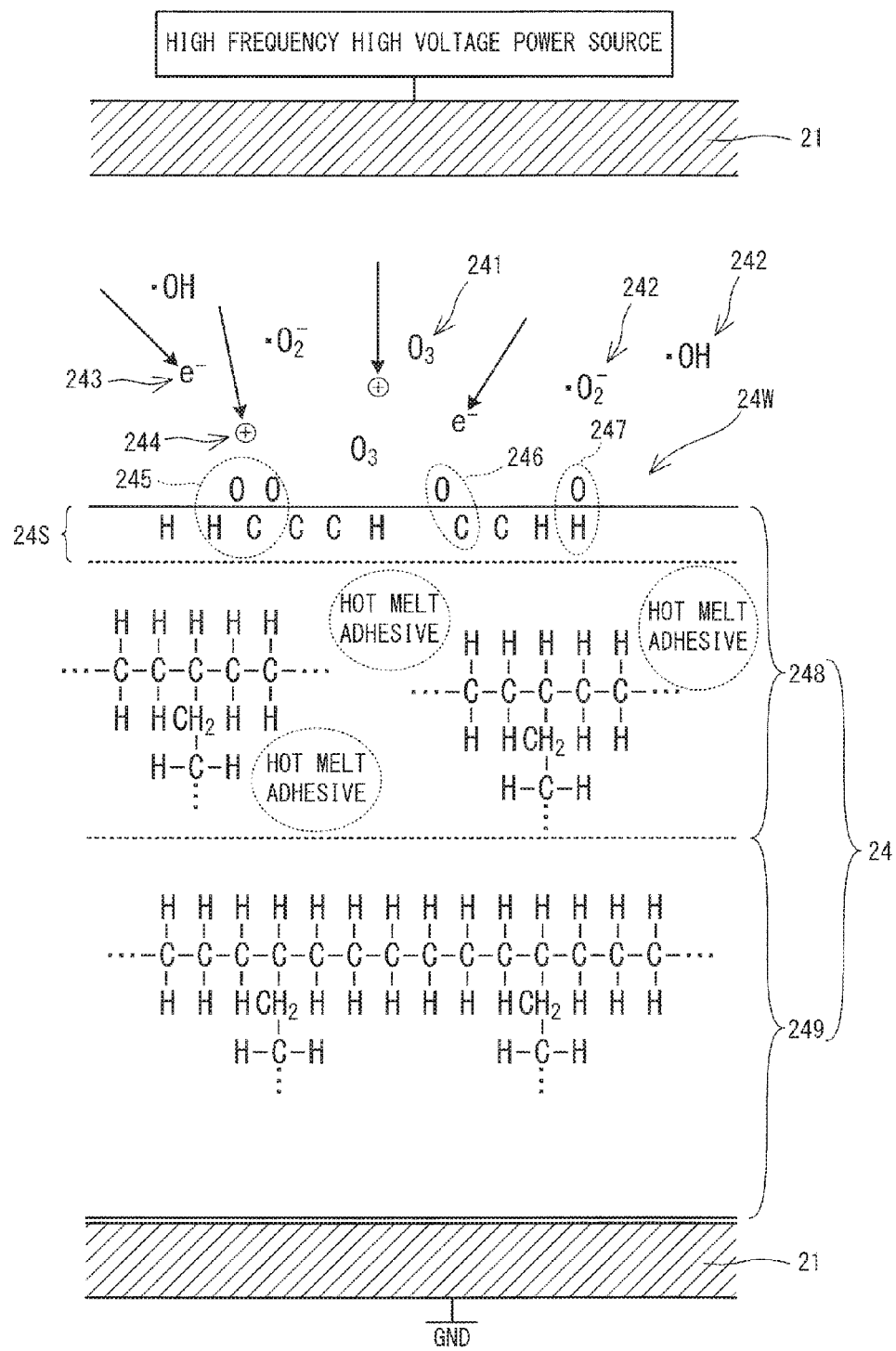
FIG. 8 is an explanatory diagram showing a manner in which polar functional groups are introduced into a surface of a film 24 by a corona treatment.

As shown in FIG. 8, the corona treatment is a treatment in which the film 24 is disposed between electrodes 21 and the surface of the film 24 is modified using plasma generated by applying a high frequency high voltage. Electrons 243 emitted from the electrode 21 by corona discharge collide with atoms and molecules in the gas phase, and cause excitation or dissociation and ionization. Furthermore, since the electrons 243 are also emitted from ionized atoms 244, a high-energy state is established between the electrodes 21 and the plasma is generated. The generated plasma causes a change in the gas phase. Then, when the electrons 243 collide with oxygen molecules in the gas phase, the oxygen molecules are dissociated to produce oxygen radicals 242 and ozone 241.

Further, the high-energy electrons 243 collide with the surface layer portion 24S of the welding layer 248 of the film 24 that is disposed between the electrodes 21. The electrons 243 cut the main chain and side chains of the polymer bonds of the hydrocarbon-based resin positioned on the surface layer portion 24S. The polymer formed by the cut main chain and side chains enters into a chemically radical state, and recombines with the oxygen radicals 242 and the ozone 241 in the gas phase. As a result of this, polar functional groups, such as a carbonyl group 246 [>C(=O)], a hydroxyl group 247 [—OH], a carboxy group 245 [—C(=O) OH] and the like, are introduced into the surface layer portion 24S of the film 24. In this manner, the polar functional groups are introduced into the surface layer portion 24S of the welding layer 248, and it is thus possible to enhance the welding strength of the welding layer 248 of the film 24. When heat is added by pressing the welding layer 248 against the base 9, the hot melt adhesive contained in the welding layer 248 melts and bonds the corrugated cardboard and the film 24. Moreover, the polar functional groups introduced into the surface layer portion 24S of the welding layer 248 mix and combine with functional groups in the fiber of the corrugated cardboard. It is therefore possible to increase the welding strength between the film 24 and the base 9.

Examples of the hydrocarbon-based resin contained in the welding layer 248 include a resin containing no polar functional group in the surface layer, a resin containing a polar functional group that is in a deep layer without being exposed to the surface layer, or a resin that is difficult to combine with another functional group due to its molecular structure. It is preferable to use a resin containing no polar functional group, because it becomes possible to obtain weldability by introducing a polar functional group using the corona treatment. Even when the resin contains a polar functional group, it may have poor weldability. For example, although polyethylene terephthalate contains a functional group, it is difficult to mix with foreign functional groups due to its molecular structure, and the weldability is low. Therefore, when the surface modification by the corona treatment is performed on polyethylene terephthalate and the surface layer portion 24S of the welding layer 248 is modified to a portion that can be easily mixed with foreign functional groups, it is possible to enhance the welding strength between the film 24 and the base 9.

Note that, when polyethylene is used as the film 24, it is desirable to use a low-density polyethylene (LDPE). In the LDPE, the main chain and side chains of the polymer bonds can be easily cut with a lower energy, as compared to a high density polyethylene (HDPE) and a linear low density polyethylene (LLDPE). Thus, the polar functional groups can easily be introduced into the surface layer portion 24S of the film 24 by corona discharge. That is, in the LDPE, more polar functional groups can be introduced into the surface layer portion 24S, as compared to the HDPE and the LLDPE. It is thus possible to further enhance the welding strength between the film 24 and the base 9.

In this manner, the film cassette 2 of the present embodiment accommodates the film 24 for which the welding strength is enhanced by further applying the corona treatment to the surface layer portion 24S of the welding layer 248 formed by a mixture of a hydrocarbon-based resin and a hot melt adhesive, and thereby introducing the polar functional groups. In the packaging device 1 having the film cassette 2 mounted thereon, the welding layer 248 of the film 24 is welded using the surface of the base 9 as a portion to be welded, without providing a portion that has been coated with an adhesive or the like in advance on the base 9. It is thus possible to fix the film 24 to the base 9 and package the packaging object 3.

Figure 9:
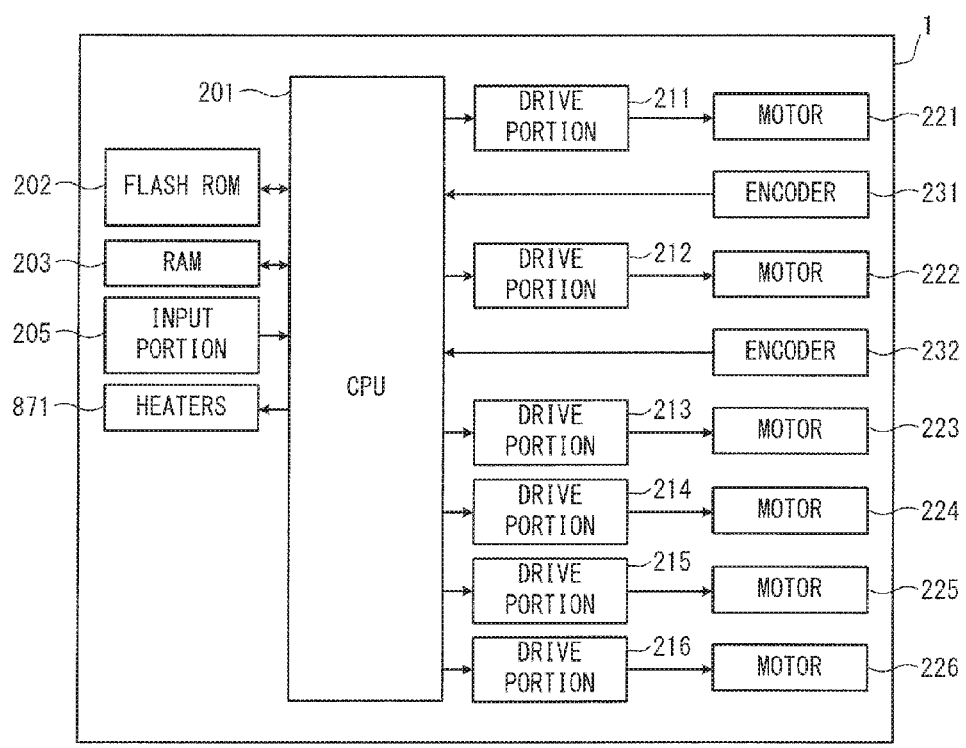
FIG. 9 is a block diagram showing an electrical configuration of the packaging device 1.

An electrical configuration of the packaging device 1 will be explained with reference to FIG. 9. The packaging device 1 is provided with a CPU 201, a flash ROM 202, a RAM 203, the input portion 205 and the heaters 871. The CPU 201 performs overall control of the packaging device 1. The CPU 201 performs the processing that packages, with the film 24, the packaging object 3 placed on the base 9, by executing a program that is stored in the flash ROM 202. The flash ROM 202 stores the program for packaging processing (refer to FIG. 10) that is performed by the CPU 201.

The packaging device 1 is provided with drive portions 211 to 216, the motors 221 to 225 and a motor 226, and encoders 231 and 232. The drive portions 211 to 216 respectively output pulse signals to the motors 221 to 226, thus driving the motors 221 to 226. The motors 221 to 226 are DC motors, for example. The encoders 231 and 232 respectively output pulse signals of a number that corresponds to the rotation of the motors 221 and 222. The CPU 201 is electrically connected to the flash ROM 202, the RAM 203, the input portion 205, the heaters 871, the drive portions 211 to 216, and the encoders 231 and 232. The drive portions 211 to 216 are electrically connected to the motors 221 to 226, respectively.

Hereinafter, the packaging processing (refer to FIG. 10) that is performed by the CPU 201 of the packaging device 1 will be explained with reference to FIG. 10 to FIG. 16. The operator places the film cassette 2 on the bridge plate 117 (refer to FIG. 2). The protruding portion 253 of the film cassette 2 is fitted into the recessed portion 18A (refer to FIG. 4) of the torque adjustment mechanism 40, and the core 22A is mounted. The gear 273 on the left end of the core 22A meshes with the gear 41 (refer to FIG. 4) provided on the torque adjustment mechanism 40 (refer to FIG. 2).

Figure 10:
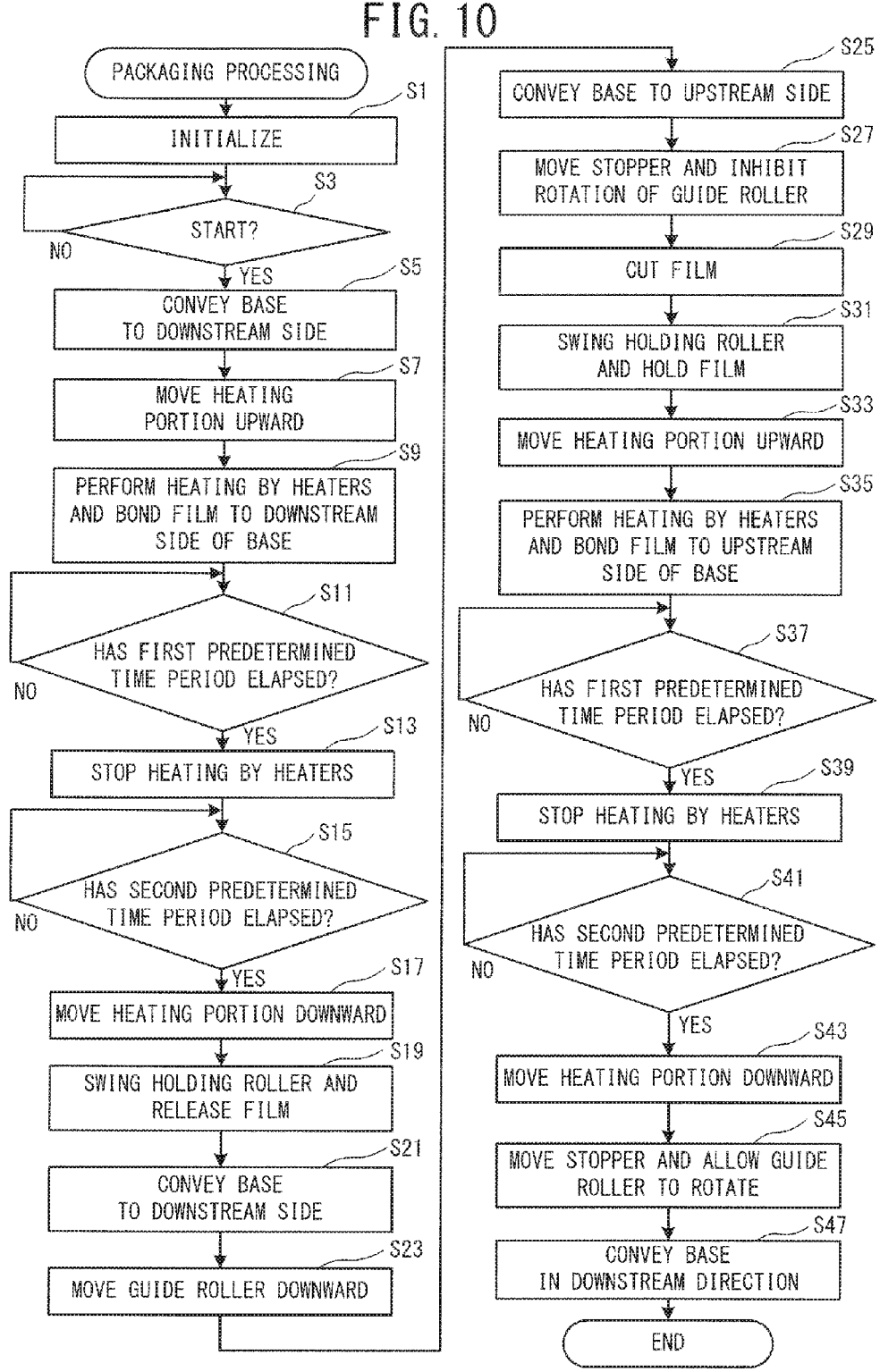
FIG. 10 is a flowchart of the packaging processing.

When the power source of the packaging device 1 is turned on, the CPU 201 starts the packaging processing by reading out and executing the program stored in the flash ROM 202. As shown in FIG. 10, the CPU 201 initializes the state of the packaging device 1 (step S1). Specifically, the initialization is performed in the following manner. The CPU 201 drives the motor 221 by controlling the drive portion 211, thus moving the support portion 34 upward such that the support portion 34 is disposed at its highest position. The guide roller 31 of the support portion 34 is disposed at the highest position of the movement path 104 (refer to FIG. 3). The CPU 201 drives the motor 222 by controlling the drive portion 212, and causes the belts 511 and 512 (refer to FIG. 2) to rotate. The conveyance portions 60 are disposed such that they protrude upward from the receiving surface 12A (refer to FIG. 2) of the receiving tray 12. The packaging device 1 is brought into a state in which the operator can set the base 9 on the receiving surface 12A of the receiving tray 12. The CPU 201 drives the motor 223 by controlling the drive portion 213, thus moving the heating portion 86 downward such that the heating portion 86 is located at the standby position. The heaters 871 on the top surface of the heating portion 86 and the elastic member 881 on the top surface of the first pressing member 88 move downward, away from the conveyance path 103 (refer to FIG. 3). The CPU 201 drives the motor 224 by controlling the drive portion 214, thus moving the stopper 81 toward the downstream side (refer to FIG. 3). The CPU 201 drives the motor 225 by controlling the drive portion 215, thus moving the cutting portion 77 to one of the left and right end portions. The CPU 201 drives the motor 226 by controlling the drive portion 216, thus causing the holding portion 78 to swing. The holding roller 72 moves downward, away from the guide roller 71 (refer to FIG. 12). When the CPU 201 has not received input of a command to start the packaging (no at step S3), the CPU 201 returns the processing to step S3.

After turning on the power source of the packaging device 1, the operator manually pulls out the film 24 discharged from the discharge opening 26 (refer to FIG. 7) of the film cassette 2. As shown in FIG. 3, the operator disposes the leading edge of the film 24 that has been pulled out, on the downstream side of the guide roller 71. The operator performs an input operation via the input portion 205 in order to notify the packaging device 1 that the preparation of the film 24 is completed. The CPU 201 drives the motor 226 by controlling the drive portion 216, thus causing the holding portion 78 to swing. The swinging of the holding portion 78 positions the holding roller 72 in the vicinity of and on the downstream side of the guide roller 71 (refer to FIG. 3). The leading edge of the film 24 that has been pulled out from the film cassette 2 is clamped by the guide roller 71 and the holding roller 72 from both the upstream side and the downstream side in the conveyance direction. The film 24 is wound around the film roll 22 such that the welding layer 248 becomes the outer peripheral surface of the film 24 (refer to FIG. 8), and the welding layer 248 is arranged on the guide roller 71 side. As described above, the torque adjustment mechanism 40 applies a torque to the gear 273 of the film cassette 2, and applies tension to the film 24 that is fed out from the film roll 22. The film 24 is put into a state in which it extends straight up and down in a direction (the up-down direction) that is substantially orthogonal to the conveyance surface.

The operator causes the leading edge (the downstream edge) of the base 9 to engage with the conveyance portions 60 (refer to FIG. 2), and places the base 9 on the receiving tray 12 (refer to FIG. 1). The base 9 is positioned by the conveyance portions 60. The edge portion 901 of the plate-shaped portion 905 of the base 9 is positioned on the downstream side, and the edge portion 902 is positioned on the upstream side. The operator places the packaging object 3 on the base 9.

The operator inputs the command to start the packaging via the input portion 205. As shown in FIG. 10, when the command to start the packaging has been received (yes at step S3), the CPU 201 drives the motor 222 by controlling the drive portion 212. As shown in FIG. 3, the belts 511 and 512 rotate in a direction (a direction of an arrow 142 in FIG. 3) in which the conveyance portions 60 (refer to FIG. 2) move from the upstream side toward the downstream side. Hereinafter, the rotation direction of the motor 222 and the belts 511 and 512 when the conveyance portions 60 are moved from the upstream side toward the downstream side is referred to as a forward direction, and the rotation direction that is opposite to the forward direction is referred to as a reverse direction. The packaging device 1 rotates the belts 511 and 512 in the forward direction, and conveys the base 9 that is engaged with the conveyance portions 60 and the packaging object 3 that is placed on the base 9 toward the downstream side in the conveyance direction (step S5).

Figure 11:
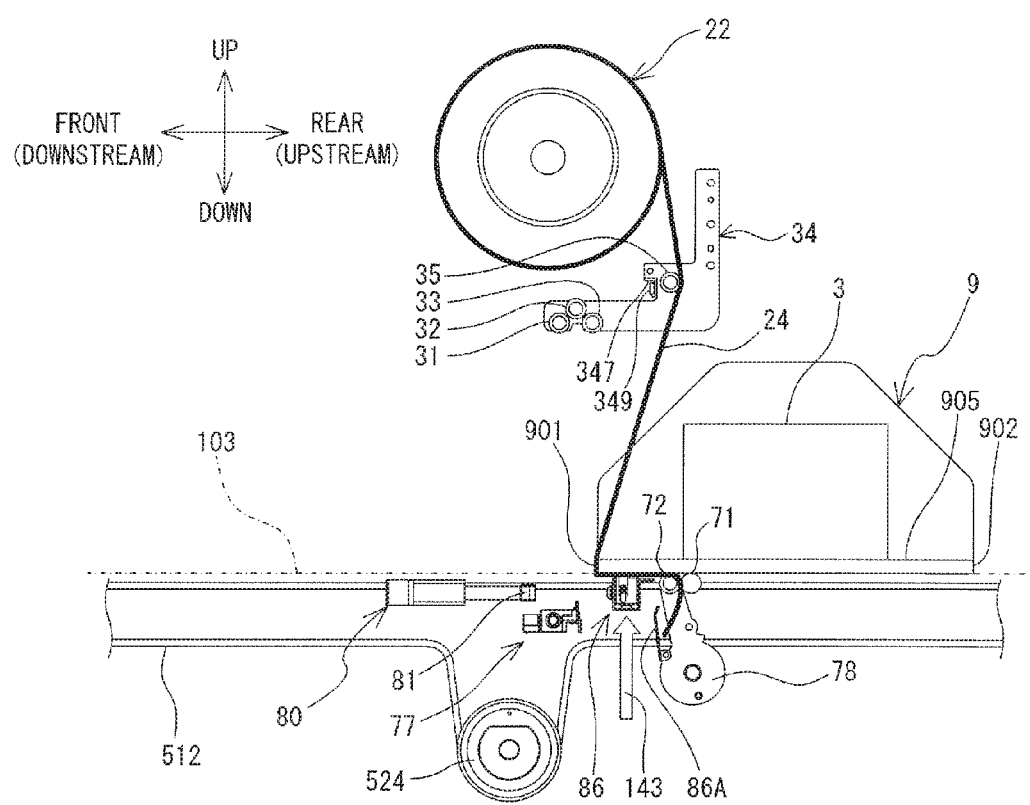
FIG. 11 is a diagram showing a packaging process by the packaging processing.

As shown in FIG. 11, the downstream edge of the base 9 (the edge portion 901 of the plate-shaped portion 905) moves on the receiving tray 12, the guide roller 71 and the holding roller 72, in that order, and comes into contact with the film 24. The CPU 201 identifies the number of rotations of the motor 222 from the start of the conveyance of the base 9, in response to the pulse signal that is output from the encoder 232. After the base 9 is further moved toward the downstream side by a predetermined distance based on the number of rotations of the motor 222, the CPU 201 stops the driving of the motor 222 by controlling the drive portion 212. The edge portion 901 of the base 9 pushes the film 24 toward the downstream side. The leading edge of the film 24 is clamped by the guide roller 71 and the holding roller 72, and the film 24 is folded at a contact portion with the edge portion 901. The film 24 is firmly attached to the bottom surface of the base 9 in a state in which the welding layer 248 faces the bottom surface on the downstream side of the base 9.

As shown in FIG. 10, the CPU 201 drives the motor 223 by controlling the drive portion 213, thus causing the heating portion 86 to move upward (step S7). As shown by an arrow 143 (refer to FIG. 11), the heating portion 86 moves upward from the standby position (refer to FIG. 3) toward the heating position. The CPU 201 uses a sensor (not shown in the drawings) to detect that the heating portion 86 has moved to the heating position. The CPU 201 stops the driving of the motor 223 by controlling the drive portion 213, thus stopping the upward movement of the heating portion 86. The top surface of the heating portion 86 comes close to the bottom surface of the base 9 (the plate-shaped portion 905) from below the conveyance path 103. Thus, the film 24 is sandwiched between the top surface of the heating portion 86 and the bottom surface of the base 9.

The CPU 201 energizes the heaters 871 of the heating portion 86 (step S9). The heaters 871 generate heat and heat the welding layer 248 at the contact portion with the film 24. The hot melt adhesive contained in the welding layer 248 melts and bonds the bottom surface of the base 9 and the film 24. Moreover, the polar functional groups introduced into the surface layer portion 24S of the welding layer 248 are mixed and combined with the functional groups contained in the fiber of the bottom surface of the base 9. Thus, the film 24 and the base 9 are welded. The CPU 201 energizes the heaters 871 for a first predetermined time period (no at step S11). The first predetermined time period is a time period required for the heaters 871 to heat the hot melt adhesive up to a melting point. After the first predetermined time period has elapsed from the start of the energization of the heaters 871 (yes at step S11), the CPU 201 stops the energization (step S13).

The CPU 201 stands by for a second predetermined time period (no at step S15). The second predetermined time period is a time period required for the temperature of the contact portion of the film 24 that has been softened by being heated by the heaters 871 to fall to a predetermined temperature. The predetermined temperature is a temperature at which it is possible to obtain a hardness with which the film 24 can withstand stretching caused by the tension applied to the film 24. After the second predetermined time period has elapsed from the stopping of the energization (yes at step S15), the CPU 201 drives the motor 223 by controlling the drive portion 213. The heating portion 86 moves downward and returns to the standby position (refer to FIG. 3) (step S17). As described above, the upper end of the first pressing member 88 is positioned higher than the upper end of the heating units 87. Further, the heating units 87 and the first pressing member 88 can move independently from each other. Therefore, the heating units 87 move away from the film 24 ahead of the first pressing member 88. The first pressing member 88 is positioned closer to the packaging object 3 than the contact portion where the heaters 871 come into contact with the film 24. Therefore, even when the contact portion of the film 24 is separated from the heaters 871 of the heating units 87, the first pressing member 88 can maintain the pressure on the film 24, and the tension of the film 24 is not immediately applied to the contact portion. Thus, the first pressing member 88 can inhibit the film 24 from being stretched at the contact portion of the film 24. Further, the first pressing member 88 can cause the contact portion of the film 24 and the heaters 871 to separate from each other while pressing against the film 24. Therefore, the heating portion 86 can reliably peel off the film 24 from the heating units 87. The CPU 201 drives the motor 226 by controlling the drive portion 216, thus causing the holding portion 78 to swing (step S19). The holding roller 72 moves away from the guide roller 71, and releases the leading edge of the film 24.

The CPU 201 drives the motor 222 by controlling the drive portion 212. The belts 511 and 512 rotate in the forward direction, and convey the base 9 that is engaged with the conveyance portions 60 toward the downstream side (step S21). The film 24 welded to the bottom surface on the downstream side of the base 9 is disposed in a position at which the film 24 covers the upper side of the base 9 and the packaging object 3. The CPU 201 continues to drive the motor 222, and conveys the base 9 further to the downstream side. When the sensor (not shown in the drawings) detects that the upstream edge of the base 9 (the edge portion 902 of the plate-shaped portion 905) is positioned further to the downstream side than the movement path 104, the CPU 201 stops the motor 222 by controlling the drive portion 212, thus stopping the conveyance of the base 9.

The CPU 201 drives the motor 221 by controlling the drive portion 211, thus moving the support portion 34 downward (step S23). As shown by an arrow 147 in FIG. 12, the support portion 34 moves downward along the movement path 104. The guide roller 31 comes into contact with the film 24 from above, and guides the film 24 downward. The film 24 is disposed in a position at which the film 24 covers the upstream side of the base 9 and the packaging object 3. The CPU 201 identifies the number of rotations of the motor 221 from the start of the downward movement of the guide roller 31, in response to the pulse signal that is output from the encoder 231. The CPU 201 causes the guide roller 31 to move to its lowest position based on the number of rotations of the motor 221, and stops the driving of the motor 221 by controlling the drive portion 211. The guide roller 31 is disposed in a position on the downstream side of the guide roller 71 and on the upstream side of the rotation inhibiting portion 80 such that the guide roller 31 faces the stopper 81. The second pressing member 349 is disposed on the conveyance path 103.

Figure 13:
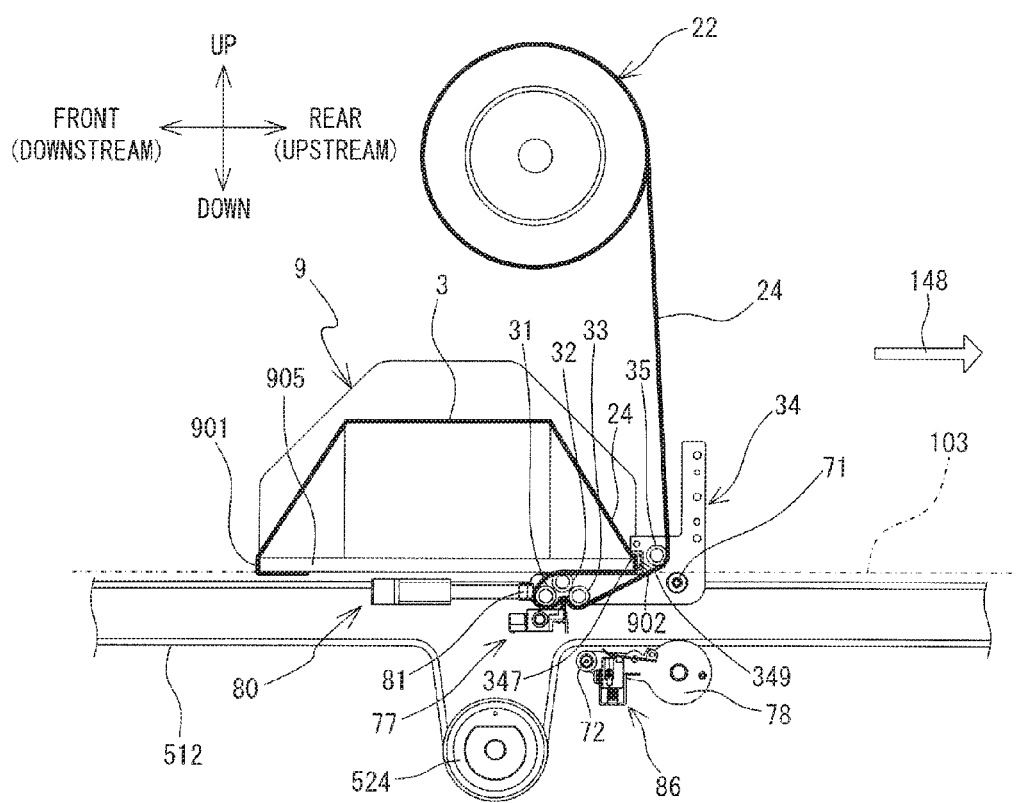
FIG. 13 is a diagram showing a packaging process by the packaging processing.
Figure 15:
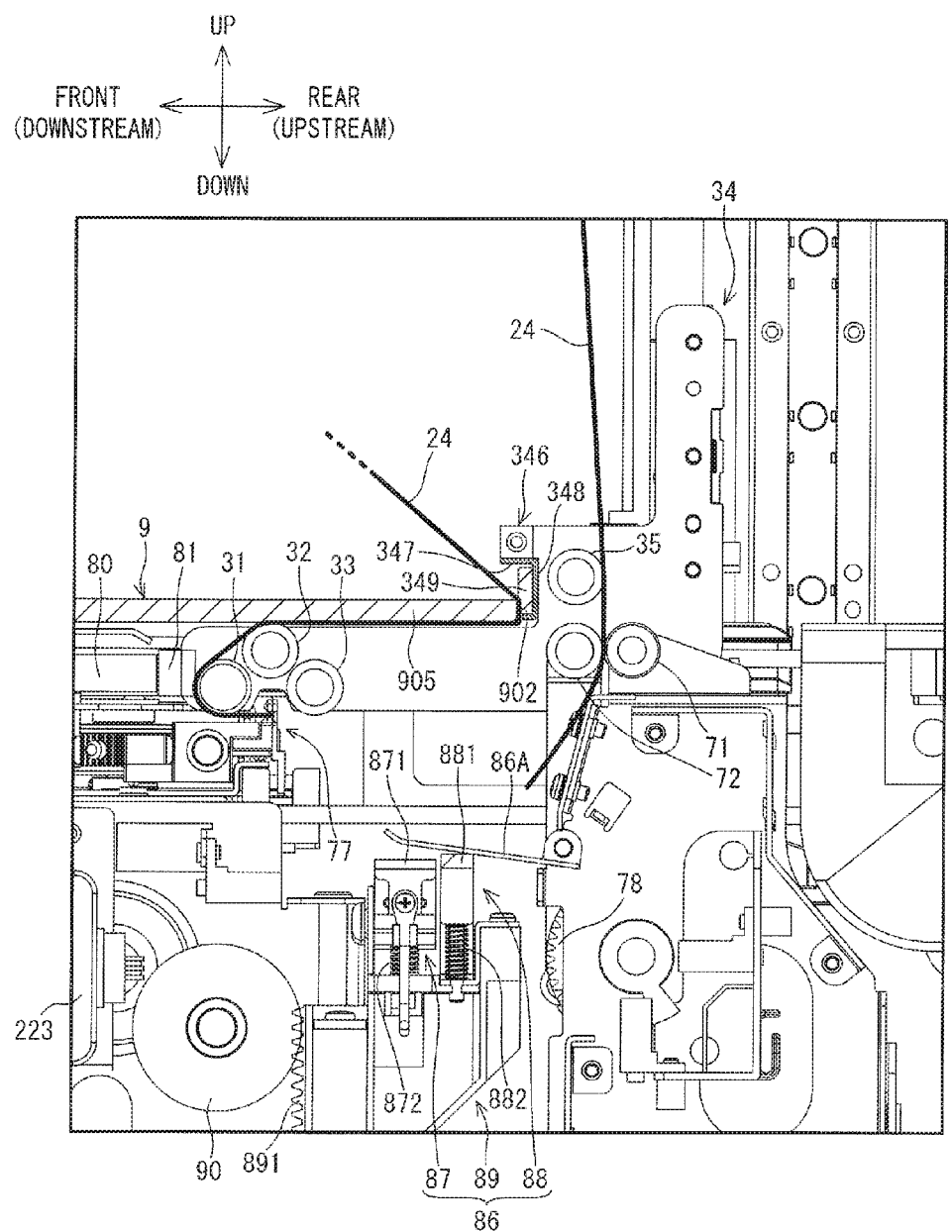
FIG. 15 is a cross-sectional view showing a packaging process by the packaging processing.

As shown in FIG. 10, the CPU 201 drives the motor 222 by controlling the drive portion 212, thus causing the belts 511 and 512 to rotate in the reverse direction (step S25). As shown in FIG. 13, the conveyance portions 60 move from the downstream side toward the upstream side, and convey the base 9 and the packaging object 3 toward the upstream side in the conveyance direction, as shown by an arrow 148. The film 24 extends downward from the position at which the film 24 covers the upstream side of the base 9 and the packaging object 3. The film 24 comes into contact with the upstream edge of the base 9 (the edge portion 902 of the plate-shaped portion 905), and is folded toward the downstream side along the bottom surface of the base 9. In the course of the movement of the base 9 toward the upstream side, the film 24 is firmly attached to the bottom surface by the tension applied to the film 24 in a state in which the welding layer 248 faces the bottom surface on the upstream side of the base 9. As shown in FIG. 10, the CPU 201 identifies the number of rotations of the motor 222 from the start of the movement of the base 9 toward the upstream side, in response to the pulse signal that is output from the encoder 232. The CPU 201 causes the conveyance portions 60 to move by the predetermined distance based on the number of rotations of the motor 222. After that, the CPU 201 stops the driving of the motor 221 by controlling the drive portion 211. As shown in FIG. 15, the edge portion 902 of the base 9 comes into contact with the second pressing member 349. The film 24 is sandwiched between the edge portion 902 and the second pressing member 349.

As shown in FIG. 10, the CPU 201 drives the motor 224 by controlling the drive portion 214, thus causing the stopper 81 of the rotation inhibiting portion 80 to move toward the upstream side (step S27). As shown in FIG. 15, the stopper 81 comes into contact with the guide roller 31 such that the film 24 is clamped between stopper 81 and the guide roller 31. The rotation of the guide roller 31 is inhibited.

As shown in FIG. 10, the CPU 201 drives the motor 225 by controlling the drive portion 215, thus moving the cutting portion 77 to the left and right along a guide rail 74. The cutting blade of the cutting portion 77 cuts a section of the film 24 that extends from the guide roller 31 toward the second auxiliary roller 33 (step S29). The tension by the torque adjustment mechanism 40 is applied to the film 24 that extends from the guide roller 31 toward the second auxiliary roller 33. The cutting portion 77 can appropriately cut the film 24. Further, the rear edge of the film 24 is clamped between the stopper 81 and the guide roller 31. Thus, the section of the film 24 that covers the base 9 and the packaging object 3 does not peel off after being cut. After the film 24 has been cut, the cut end of the film 24 that extends from the film roll 22 hangs down below the guide roller 71 (refer to FIG. 14).

Figure 14:
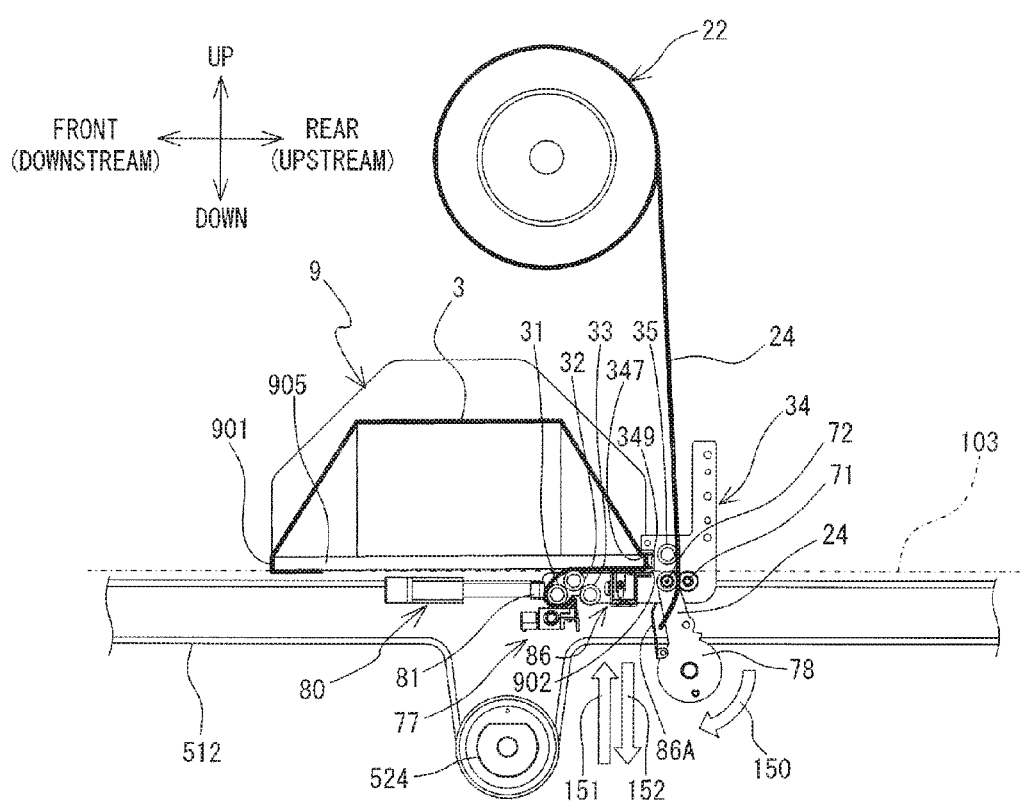
FIG. 14 is a diagram showing a packaging process by the packaging processing.

The CPU 201 drives the motor 226 by controlling the drive portion 216, thus causing the holding portion 78 to swing (step S31). As shown in FIG. 14, the holding portion 78 swings as shown by an arrow 150, and causes the holding roller 72 to come close to the downstream side of the guide roller 71. The leading edge of the film 24 is clamped between the holding roller 72 and the guide roller 71.

Figure 16:
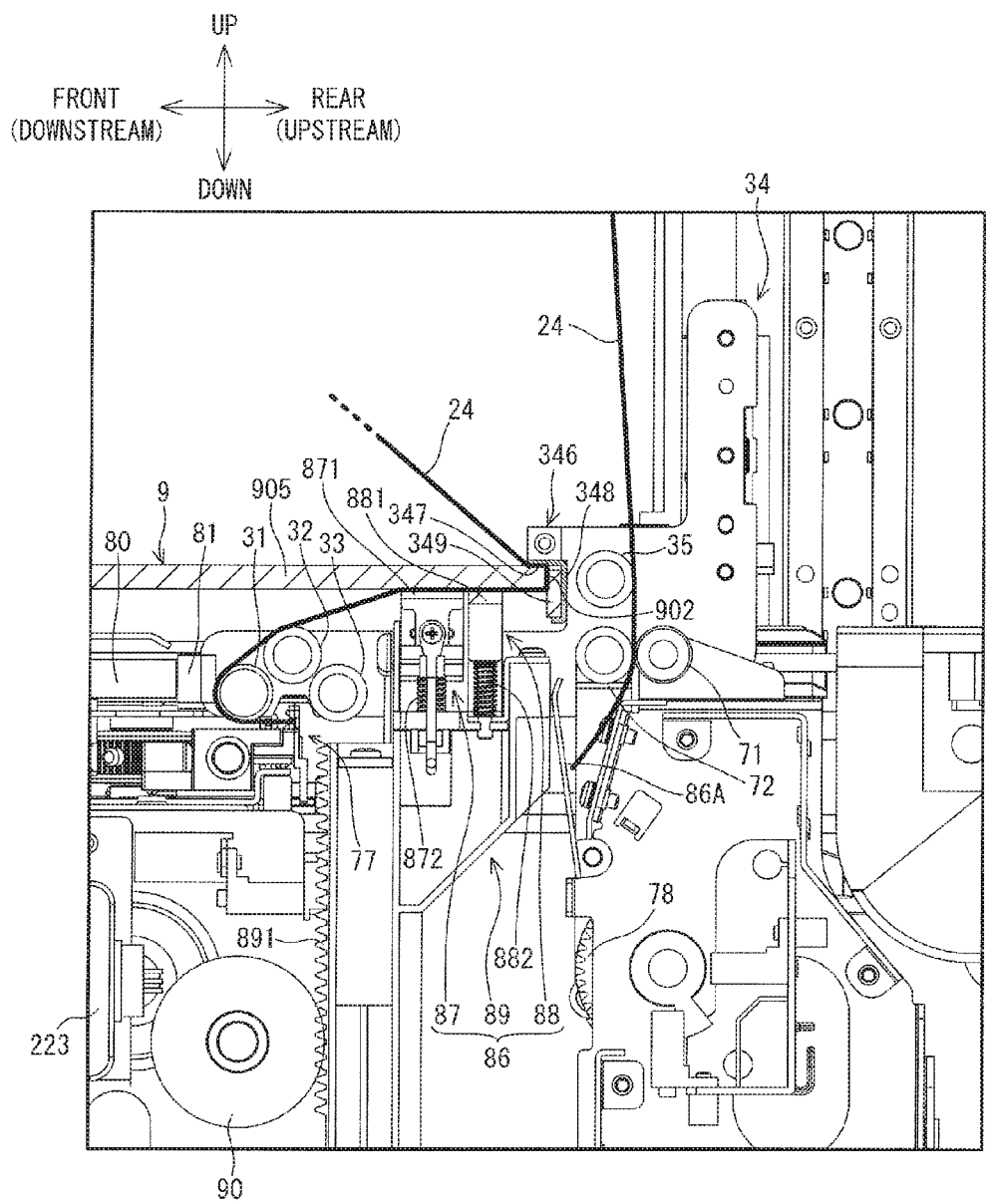
FIG. 16 is a cross-sectional view showing a packaging process by the packaging processing.

As shown in FIG. 10, the CPU 201 drives the motor 223 by controlling the drive portion 213, thus causing the heating portion 86 to move upward (step S33). As shown by an arrow 151 (refer to FIG. 14), the heating portion 86 moves upward from the standby position (refer to FIG. 13) toward the heating position. As shown in FIG. 16, the top surface of the first pressing member 88 comes close to the bottom surface of the base 9 (the plate-shaped portion 905) from below the conveyance path 103. The film 24 is sandwiched between the first pressing member 88 and the bottom surface of the base 9, and the first pressing member 88 pushes up the base 9. The top surface of the base 9 comes into contact with the locking member 347 of the support portion 34. The spring member 882 of the first pressing member 88 deflects. The heaters 871 of the heating units 87 come close to the bottom surface of the base 9, and the film 24 is sandwiched between the heaters 871 and the bottom surface of the base 9. The spring member 872 of the heating units 87 deflects. The CPU 201 uses the sensor (not shown in the drawings) to detect that the heating portion 86 has moved to the heating position. The CPU 201 stops the driving of the motor 223 by controlling the drive portion 213, thus stopping the upward movement of the heating portion 86.

As shown in FIG. 10, the CPU 201 energizes the heaters 871 of the heating portion 86 (step S35). The heaters 871 generate heat and heat the welding layer 248 of the film 24. The hot melt adhesive contained in the welding layer 248 melts and bonds the bottom surface of the base 9 and the film 24. Moreover, the polar functional groups introduced into the surface layer portion 24S of the welding layer 248 mix and combine with the functional groups contained in the fiber of the bottom surface of the base 9. Thus, the film 24 and the base 9 are welded. The CPU 201 energizes the heaters 871 for the first predetermined time period (no at step S37). After the first predetermined time period has elapsed (yes at step S37), the CPU 201 stops the energization (step S39). The CPU 201 stands by for the second predetermined time period (no at step S41), and after the second predetermined time period has elapsed (yes at step S41), the CPU 201 drives the motor 223 by controlling the drive portion 213. As shown by an arrow 152 (refer to FIG. 14), the heating portion 86 moves downward and returns to the standby position (refer to FIG. 15) (step S43). As described above, the heating units 87 and the first pressing member 88 can move independently from each other. The heating units 87 move away from the film 24 ahead of the first pressing member 88. Therefore, even when the contact portion of the film 24 is separated from the heaters 871 of the heating units 87, the first pressing member 88 can maintain the pressure on the film 24, and the tension of the film 24 is not immediately applied to the contact portion. Thus, the first pressing member 88 can inhibit the film 24 from being stretched at the contact portion of the film 24. Further, the first pressing member 88 can cause the contact portion of the film 24 and the heaters 871 to separate from each other while pressing against the film 24. Therefore, the heating portion 86 can reliably peel off the film 24 from the heating units 87. Moreover, when the heating is performed by the heating units 87 and when the heating units 87 move away from the film 24, the second pressing member 349 presses and holds the film 24 on the side closer to the packaging object 3 than the first pressing member 88. Thus, the second pressing member 349 can alleviate the tension of the film 24 exerted on the first pressing member 88.

The CPU 201 drives the motor 224 by controlling the drive portion 214, thus causing the stopper 81 of the rotation inhibiting portion 80 to move toward the downstream side. The stopper 81 moves away from the guide roller 31, and releases the rear edge of the film 24 used to package the base 9 and the packaging object 3. The guide roller 31 is brought into a rotatable state (step S45).

The CPU 201 drives the motor 222 by controlling the drive portion 212. The belts 511 and 512 rotate in the forward direction, and convey the packaging object 3 and the base 9 that is engaged with the conveyance portions 60 toward the downstream side (step S47). The CPU 201 identifies the number of rotations of the motor 222 from the start of the conveyance of the base 9 toward the downstream side, in response to the pulse signal that is output from the encoder 232. Based on the number of rotations of the motor 222, the CPU 201 causes the conveyance portions 60 to move to the position of the driven pulley 525. The CPU 201 stops the driving of the motor 222 by controlling the drive portion 212. The base 9 and the packaging object 3 for which the packaging is complete are placed on the receiving tray 13. The packaging processing ends.

As explained above, the film 24 of the present embodiment contains a hot melt adhesive in the welding layer 248. Therefore, when the film 24 is heated in a state in which the welding layer 248 is in contact with a portion to be welded, the hot melt adhesive in the welding layer 248 melts. Thus, the film 24 is welded to the portion to be welded. Therefore, the packaging device 1 can directly weld the resin film 24 to the portion to be welded.

Further, since there are many polar functional groups on the surface layer portion 24S of the welding layer 248, the film 24 can be firmly welded to the portion to be welded. By applying the corona treatment or the plasma treatment, the polar functional groups can be introduced into the surface layer portion 24S of the welding layer 248. It is thus possible to firmly weld the welding layer 248 to the portion to be welded.

Further, of sections of the film 24, the tension resulting from the packaging of the packaging object 3 is more likely to be applied to a section on the side of contact with the packaging object 3 than to the contact portion that is heated by the heaters 871 of the heating units 87. Since the first pressing member 88 presses, toward the base 9, the section on the side of the packaging object 3 rather than the contact portion of the film 24 with the heaters 871, the tension resulting from the packaging of the packaging object 3 is not applied to the contact portion. Therefore, even when the heating units 87 heat the contact portion of the film 24, a melted portion in the contact portion is not stretched by the tension. Thus, the packaging device 1 can reliably weld the film 24 to the portion to be welded.

Further, the heating units 87 and the first pressing member 88 can move independently from each other. Therefore, the timing at which the heating units 87 heat the film 24, and the timing at which the first pressing member 88 presses the film 24 can be set to be different. When the base portion 89 moves downward after the welding layer 248 has been heated by the heating units 87, the heating units 87 can separate from the contact portion ahead of the first pressing member 88. Thus, the packaging device 1 can reliably peel off the film 24 from the heating units 87 after the heating of the contact portion.

Further, when the base portion 89 moves upward and presses the film 24 against the base 9, the base 9 is restricted by the locking member 347 and does not move upward. Therefore, the heating units 87 can heat the contact portion while the film 24 is reliably in contact with the base 9. Further, the second pressing member 349 presses and holds the film 24 at the time of heating. Thus, the packaging device 1 can alleviate the tension of the film 24 that is exerted on the first pressing member 88.

Note that the present disclosure is not limited to the above-described embodiment and various modifications are possible. The surface modification processing by corona discharge is performed on the film 24, and the polar functional groups are introduced into the surface layer portion 24S. However, processing by plasma discharge may be performed to introduce the polar functional groups. Although the welding layer 248 is formed on one of the surfaces of the film 24, the welding layer 248 may be formed on both the surfaces. Further, the polar functional groups need not necessarily be introduced into the surface layer portion 24S of the welding layer 248. Further, although the film 24 is formed by laminating the welding layer 248 and the base layer 249, the film 24 need not necessarily include the base layer 249 and may be a single layer film made of the welding layer 248 only. Furthermore, although the welding layer 248 is a layer formed by a mixture of a hydrocarbon-based resin and a hot melt adhesive, it may be a layer formed by a hot melt adhesive only.

Figure 17:
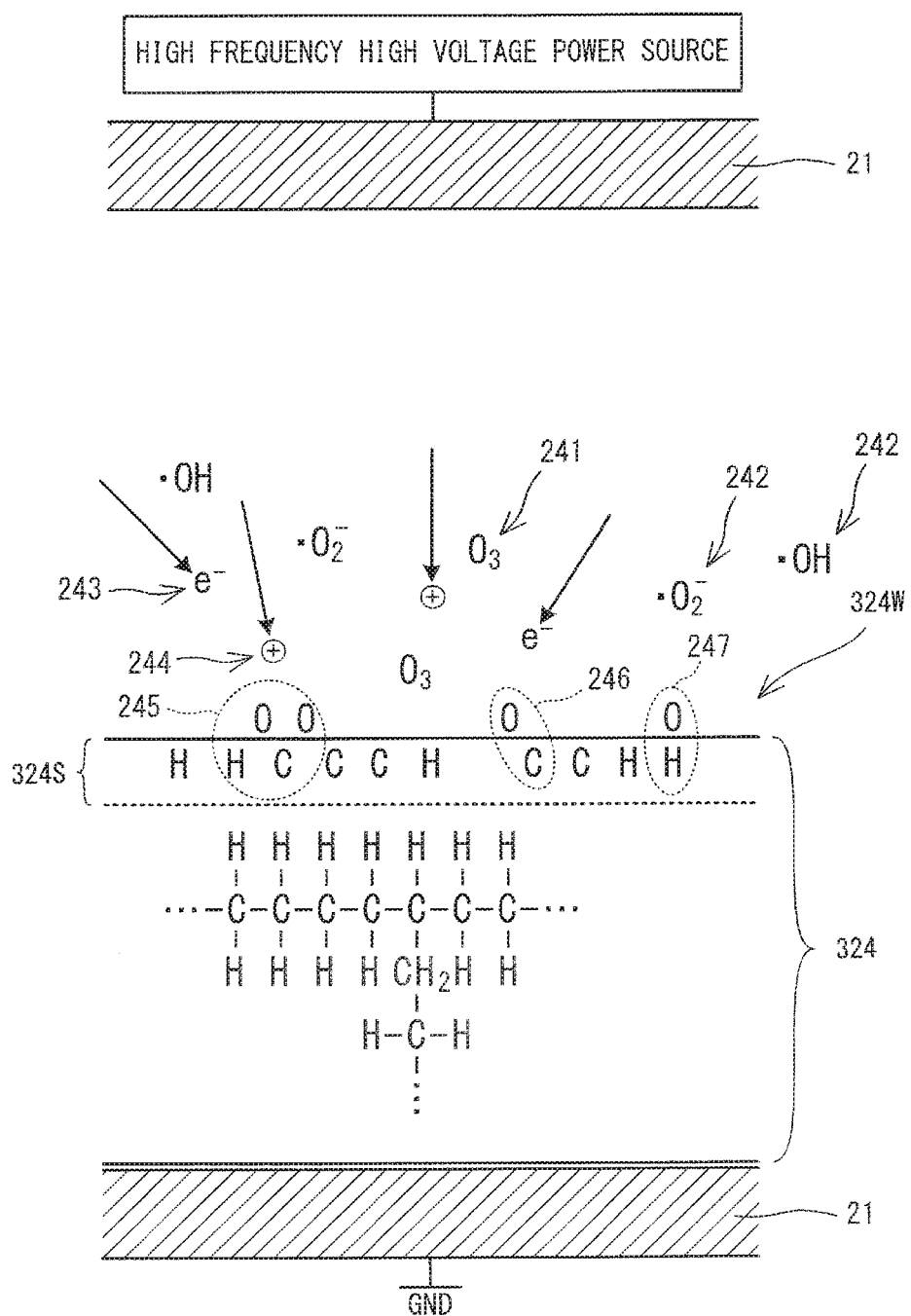
FIG. 17 is an explanatory diagram showing a manner in which the polar functional groups are introduced into a surface of a film 324 by the corona treatment.

Further, a film, such as a film 324 shown in FIG. 17, may be used. The film 324 does not include a hot melt adhesive and is provided with a welding portion 324W obtained by introducing the polar functional groups onto a surface layer portion 324S of a single layer film formed of a hydrocarbon-based resin.

As shown in FIG. 17, the film 324 is disposed between the electrodes 21, and the corona treatment is performed to modify the surface of the film 324 using plasma generated by applying a high frequency high voltage. In the same manner as the above-described embodiment, the electrons 243 emitted from the electrode 21 by corona discharge collide with the surface layer portion 324S of the film 324, and cut the main chain and side chains of the polymer bonds positioned on the surface layer portion 324S. The polymer formed of the cut main chain and side chains recombines with the oxygen radicals 242 and the ozone 241 in the gas phase. As a result, it is possible to obtain the film 324 that is provided with the welding portion 324W obtained by introducing the polar functional groups into the surface layer portion 324S of at least one of the surfaces. When the welding portion 324W is pressed against the base 9 and heat is applied to the welding portion 324W, the functional groups in the fiber of the corrugated cardboard mix and combine with the polar functional groups on the surface layer portion 324S of the film 324. It is thus possible to directly weld the single layer film 324 to the base 9.

When the welding portion 324W is formed on the entire surface of this type of the film 324, there is no need to perform positioning of the welding portion 324W with respect to the base 9, and the welding can be performed easily. Further, by applying the corona treatment or the plasma treatment, the polar functional groups can be reliably and easily introduced into the surface layer portion 324S of the film 324. The film 324 into which the polar functional groups are introduced in this manner can be formed not only by the above-described corona treatment, but also by laminating a film including the polar functional groups on a normal film. Further, although the surface modification by corona discharge is performed on the film 324 and the polar functional groups are introduced into the surface layer portion 324S, the treatment by plasma discharge may be performed to introduce the polar functional groups. Although the welding portion 324W is formed on one of the surfaces of the film 324, the welding portions 324W may be formed on both the surfaces, respectively. As for the surface of the film 324 on which the welding portion 324W is formed, the welding portion 324W may be formed on the entire surface or may be formed on a part of the surface. For example, the packaging device 1 may be provided with a device that can apply the corona treatment, and may perform the corona treatment in a limited way to a welding section of the resin film to be welded to the base 9. In this case, even when the film cassette 2 that contains a general use resin film is mounted on the packaging device 1, the welding with the base 9 can be performed by forming the welding portion 324W in a necessary section of the film as appropriate.

Further, the film 324 may be a laminated body obtained, for example, by adhering a film including polar functional groups to a resin film that does not include polar functional groups. As a matter of course, the film into which polar functional groups are introduced may be formed such that resin films including no polar functional groups are laminated to each other and then the corona treatment is applied thereto.

Furthermore, although the base formed of corrugated cardboard is used as an example of the base 9, a base formed of paperboard or a base formed of a wood material may be used.

Furthermore, the torque adjustment mechanism 40 may be provided with a motor that transmits a driving force to the core 22A of the film roll 22 via the gear 41. The torque adjustment mechanism 40 may adjust the tension exerted on the film 24 by feeding out or taking up the film 24 by the driving of the motor. The film cassette 2 need not necessarily be provided with the cassette case 25, and may be structured by the film roll 22 having the core 22A around which the film 24 is wound.

What is claimed is:

1. A packaging device comprising:
    a resin film including a welding portion capable of being welded to a portion to be welded, the welding portion containing a hot melt adhesive;
    a covering device configured to cover, with the resin film, at least a part of a packaging object placed on a base made of paper and at least a part of the base;
    a heating device configured to heat a contact portion in a state in which the contact portion is in contact with the base, the contact portion being a part of the welding portion of the resin film;
    a conveyance device configured to convey the base on which the packaging object is placed in a conveyance direction;
    a first pressing device configured to press, among sections of the resin film, a section on a side of contact with the packaging object, rather than the contact portion, toward the base; and
    a lifting device configured to ascend and descend, the lifting device holding the first pressing device and the heating device below a conveyance path along which the base that is conveyed by the conveyance device passes, and the lifting device causing the heating device and the first pressing device to move upward when heating is performed by the heating device, wherein in a state in which the lifting device has moved downward, an upper end of the first pressing device is positioned higher than an upper end of the heating device.

2. The packaging device according to claim 1, wherein a number of polar functional groups contained in a surface layer of the welding portion is larger than a number of polar functional groups contained in another section.

3. The packaging device according to claim 2, wherein one of a corona treatment and a plasma treatment is applied to a surface of the welding portion.

4. The packaging device according to claim 1, wherein the resin film is a laminated resin film.

5. The packaging device according to claim 1, further comprising:
a shaft member on which the resin film is wound;
a gear provided on at least one end, in an extending direction of a central axis, of the shaft member;
a meshing portion meshing with the gear; and
a mounting portion allowing attachment and detachment of the shaft member.

6. A packaging device comprising:
a film in which a number of polar functional groups contained in a surface layer is larger than a number of polar functional groups contained in another section, the film including a welding portion capable of being welded to a portion to be welded;
a covering device configured to cover, with the film, at least a part of a packaging object placed on a base made of paper and at least a part of the base;
a heating device configured to heat a contact portion in a state in which the contact portion is in contact with the base, the contact portion being a part of the welding portion of the film;
a conveyance device configured to convey the base on which the packaging object is placed in a conveyance direction;
a first pressing device configured to press, among sections of the film, a section on a side of contact with the packaging object, rather than the contact portion, toward the base; and
a lifting device configured to ascend and descend, the lifting device holding the first pressing device and the heating device below a conveyance path along which the base that is conveyed by the conveyance device passes, and the lifting device causing the heating device and the first pressing device to move upward when heating is performed by the heating device, wherein in a state in which the lifting device has moved downward, an upper end of the first pressing device is positioned higher than an upper end of the heating device.

7. The packaging device according to claim 6, wherein the welding portion is formed by applying one of a corona treatment and a plasma treatment to a surface of the film.

8. The packaging device according to claim 6, wherein the film is a laminated film.

9. The packaging device according to claim 6, further comprising:
a shaft member on which the film is wound;
a gear provided on at least one end, in an extending direction of a central axis, of the shaft member;
a meshing portion meshing with the gear; and
a mounting portion allowing attachment and detachment of the shaft member.

10. A packaging device comprising:
a mounting portion allowing attachment and detachment of a shaft member of a film roll formed by winding a resin film around the shaft member, the resin film including a welding portion which contains a hot melt adhesive and which is capable of being welded to a portion to be welded;
a covering device configured to cover at least a part of a packaging object placed on a base made of paper and at least a part of the base, using the resin film pulled out from the film roll;
a heating device configured to heat a contact portion in a state in which the contact portion is in contact with the base, the contact portion being a part of the welding portion of the resin film;
a conveyance device configured to convey the base on which the packaging object is placed in a conveyance direction;
a first pressing device configured to press, among sections of the resin film, a section on a side of contact with the packaging object, rather than the contact portion, toward the base;
a lifting device configured to ascend and descend, the lifting device holding the first pressing device and the heating device below a conveyance path along which the base that is conveyed by the conveyance device passes, and the lifting device causing the heating device and the first pressing device to move upward when heating is performed by the heating device, wherein in a state in which the lifting device has moved downward, an upper end of the first pressing device is positioned higher than an upper end of the heating device.

11. The packaging device according to claim 10, wherein the first pressing device is capable of moving toward the base independently from the heating device.

12. The packaging device according to claim 10, further comprising:
a restricting device configured to be disposed above the conveyance path at least when the lifting device ascends, and to restrict upward movement of the base.

13. The packaging device according to claim 10, further comprising:
a second pressing device configured to be disposed on the conveyance path at least when heating is performed by the heating device, and to press the resin film toward the base.

14. The packaging device according to claim 10, further comprising:
a control device configured to control ascending and descending of the lifting device and heating by the heating device,
wherein
the control device performs the steps of:
upwardly moving the heating device and the first pressing device by controlling the lifting device;
performing heating for a first predetermined time period by controlling the heating device;
counting an elapse of a second predetermined time period after the heating by the heating device is completed; and
downwardly moving the heating device and the first pressing device by controlling the lifting device after the second predetermined time period has lapsed.

* * * * *